United States Patent
Deishi et al.

(10) Patent No.: US 11,085,820 B2
(45) Date of Patent: Aug. 10, 2021

(54) DIAGNOSIS ASSISTANCE DEVICE FOR OPTICAL CHARACTERISTIC MEASUREMENT DEVICE, AND DIAGNOSIS ASSISTANCE METHOD FOR OPTICAL CHARACTERISTIC MEASUREMENT DEVICE

(71) Applicant: KONICA MINOLTA, INC., Chiyoda (JP)

(72) Inventors: Satoshi Deishi, Ibaraki (JP); Takuya Matsumoto, Toyokawa (JP); Hironori Chono, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 97 days.

(21) Appl. No.: 16/339,296

(22) PCT Filed: Oct. 2, 2017

(86) PCT No.: PCT/JP2017/035860
§ 371 (c)(1),
(2) Date: Apr. 3, 2019

(87) PCT Pub. No.: WO2018/066524
PCT Pub. Date: Apr. 12, 2018

(65) Prior Publication Data
US 2020/0041341 A1    Feb. 6, 2020

(30) Foreign Application Priority Data
Oct. 6, 2016    (JP) .............................. JP2016-198117

(51) Int. Cl.
*G01J 3/02* (2006.01)
*G01J 3/50* (2006.01)

(52) U.S. Cl.
CPC ............... *G01J 3/0297* (2013.01); *G01J 3/50* (2013.01)

(58) Field of Classification Search
None
See application file for complete search history.

(56) References Cited

U.S. PATENT DOCUMENTS

| 6,590,648 | B1 | 7/2003 | von Orelli et al. |
| 2005/0007600 | A1* | 1/2005 | Rafac ............... G01J 1/4257 356/519 |

(Continued)

FOREIGN PATENT DOCUMENTS

| JP | 6-348613 | 12/1994 |
| JP | 10-132826 | 5/1998 |

(Continued)

OTHER PUBLICATIONS

International Search Report issued in corresponding PCT/JP2017/035860.

(Continued)

*Primary Examiner* — Shawn Decenzo
(74) *Attorney, Agent, or Firm* — Cozen O'Connor

(57) ABSTRACT

A diagnosis assistance device assists a diagnosis of an optical characteristic measurement device which operates on the basis of the content of setting stored in a setting storage unit of an optical characteristic measurement device, and includes a first storage unit, a second storage unit, a processing unit, a first command unit, a diagnosis unit, and a second command unit. The first storage unit stores in advance first setting information which indicates the content of setting at the time of diagnosis. The processing unit performs processing of acquiring, from the setting storage unit, second setting information which is stored in advance in the setting storage unit and indicates the content of setting at the time of use, and storing the acquired second setting (Continued)

information in the second storage unit. The first command unit issues a command to store the first setting information stored in the first storage unit in the setting storage unit. The diagnosis unit acquires a measurement result indicating a value measured by the optical characteristic measurement device which operates on the basis of the content of setting indicating the first setting information stored in the setting storage unit. The second command unit issues a command to store the second setting information stored in the second storage unit in the setting storage unit after the measurement result is acquired.

13 Claims, 12 Drawing Sheets

(56) References Cited

U.S. PATENT DOCUMENTS

| | | | |
|---|---|---|---|
| 2006/0109458 A1* | 5/2006 | Watanabe | G01N 21/251 356/243.4 |
| 2011/0235034 A1* | 9/2011 | Fukuda | G01J 3/02 356/319 |
| 2013/0107260 A1* | 5/2013 | Nozawa | G01J 3/26 356/402 |
| 2019/0041262 A1* | 2/2019 | Hasegawa | H04Q 9/00 |
| 2020/0116627 A1* | 4/2020 | Kessler | G01J 3/501 |

FOREIGN PATENT DOCUMENTS

| | | |
|---|---|---|
| JP | 2002-230200 | 8/2002 |
| JP | 2004-309249 | 11/2004 |
| JP | 2013-15399 | 1/2013 |

OTHER PUBLICATIONS

Written Opinion issued in corresponding PCT/JP2017/035860.
Extended Search Report dated Dec. 16, 2019 issued in European Patent Application No. 17858362.1.
Office Action dated Jan. 15, 2021 issued in Japanese Patent Application No. 2018-543900.

* cited by examiner

DIAGNOSIS ASSISTANCE DEVICE FOR OPTICAL CHARACTERISTIC MEASUREMENT DEVICE, AND DIAGNOSIS ASSISTANCE METHOD FOR OPTICAL CHARACTERISTIC MEASUREMENT DEVICE

RELATED APPLICATIONS

This is a U.S. National Phase Application under 35 USC 371 of International Application PCT/JP2017/035860 filed on Oct. 2, 2017.

This application claims the priority of Japanese application no. 2016-198117 filed Oct. 6, 2016, the entire content of which is hereby incorporated by reference.

TECHNICAL FIELD

The present invention relates to a technique for diagnosing an optical characteristic measurement device (for example, a colorimeter or a glossmeter).

BACKGROUND ART

An optical characteristic measurement device is a device which measures optical characteristics (for example, color and gloss) of measurement objects (for example, a vehicle body and a bumper of a vehicle). In order to guarantee the reliability of data (for example, a value of color and a value of gloss) indicating the optical characteristics of the measurement object obtained by the measurement, it is necessary to guarantee the reliability of the optical characteristic measurement device.

In order to guarantee the reliability of the optical characteristic measurement device, the optical characteristic measurement device is diagnosed periodically (for example, every day). The optical characteristic measurement device having a function of measuring color will be described as an example. Before the optical characteristic measurement device is first used, color of a reference plate (for example, green color tile) is measured by the optical characteristic measurement device. At this time, the value measured is set as an initial value. The optical characteristic measurement device periodically measures the color of the same reference plate. When a value obtained by this measurement and the initial value (or the value obtained by the previous measurement) are the same or when there is little difference between these values, it is diagnosed that the optical characteristic measurement device can measure color accurately. If these values are not the same or the difference between these values is large, it is diagnosed that the optical characteristic measurement device cannot accurately measure color.

In order to diagnose the optical characteristic measurement device, the optical characteristic measurement device needs to perform various settings necessary for the measurement in advance at the time of measuring the color of the reference plate. As techniques associated therewith, there are Patent Literature 1 and Patent Literature 2. Patent Literature 1 discloses that before a validation of an analysis device is performed, a user operates an operating unit to set measurement conditions and inspection conditions, and the validation is performed under the setting. Patent Literature 2 discloses that the user sets inspection items prior to performing a periodic inspection of a spectrophotometer.

In the optical characteristic measurement device, the content of setting at the time of measuring the color of the measurement object and the content of setting at the time of measuring the color of the reference plate for the diagnosis of the optical characteristic measurement device may be different from each other. That is, in the optical characteristic measurement device, the content of setting at the time of use may be different from the content of setting at the time of diagnosis. For example, a multi-angle colorimeter can simultaneously measure colors from a plurality of angles. For the diagnosis of the multi-angle colorimeter, the colors are simultaneously measured from, for example, 45°, 105°, and 135° when measuring the color of the reference plate. When the multi-angle colorimeter is used, the colors of the measurement object may be simultaneously measured from, for example, 45° and 135° in order to save time.

Inconvenience may occur if the optical characteristic measurement device uses the content set in the optical characteristic measurement device as it is for the diagnosis of the optical characteristic measurement device. In the description associated with the above example, since the color should be measured from the angles of 45° and 135° with respect to the measurement object but the color should be measured from the angles of 45°, 105°, and 135°, it takes long time to measure the color of the measurement object.

CITATION LIST

Patent Literature

Patent Literature 1: JP 2013-15399 A (paragraphs 0024 and 0025)

Patent Literature 2: JP 2002-230200 A (paragraphs 0023 and 0024)

SUMMARY OF INVENTION

An object of the present invention is to provide a diagnosis assistance device of an optical characteristic measurement device and a diagnosis assistance method of an optical characteristic measurement device capable of preventing the optical characteristic measurement device from being used while the optical characteristic measurement device remains set at the time of diagnosis.

In order to achieve the above object, a diagnosis assistance device of an optical characteristic measurement device according to one aspect of the present invention is a device which assists a diagnosis of the optical characteristic measurement device operated on the basis of a content of setting stored in a setting storage unit of the optical characteristic measurement device at a time of use and at a time of diagnosis of the optical characteristic measurement device, and includes a first storage unit, a second storage unit, a processing unit, a first command unit, a diagnosis unit, and a second command unit. The first storage unit stores in advance first setting information indicating the content of setting at the time of diagnosis. The processing unit performs processing of acquiring, from the setting storage unit, second setting information which is stored in advance in the setting storage unit and indicates the content of setting at the time of use, and storing the acquired second setting information in the second storage unit. The first command unit issues a command to store the first setting information, which is stored in the first storage unit, in the setting storage unit after the second setting information is stored in the second storage unit. The diagnosis unit acquires a measurement result indicating a value measured by the optical characteristic measurement device operated on the basis of the content of setting indicated by the first setting information stored in the setting storage unit, and generates information necessary for the diagnosis of the optical characteristic measurement device using the acquired measurement result. The second command unit issues a command to store the second setting information, which is stored in the second storage unit, in the setting storage unit after the diagnosis unit acquires the measurement result.

Advantages and features provided by one or more embodiments of the invention are fully understood from the detailed description given below and the accompanying drawings. These detailed descriptions and the accompanying drawings are given by way of example only and are not intended as limiting the invention.

DESCRIPTION OF EMBODIMENTS

Figure 1:
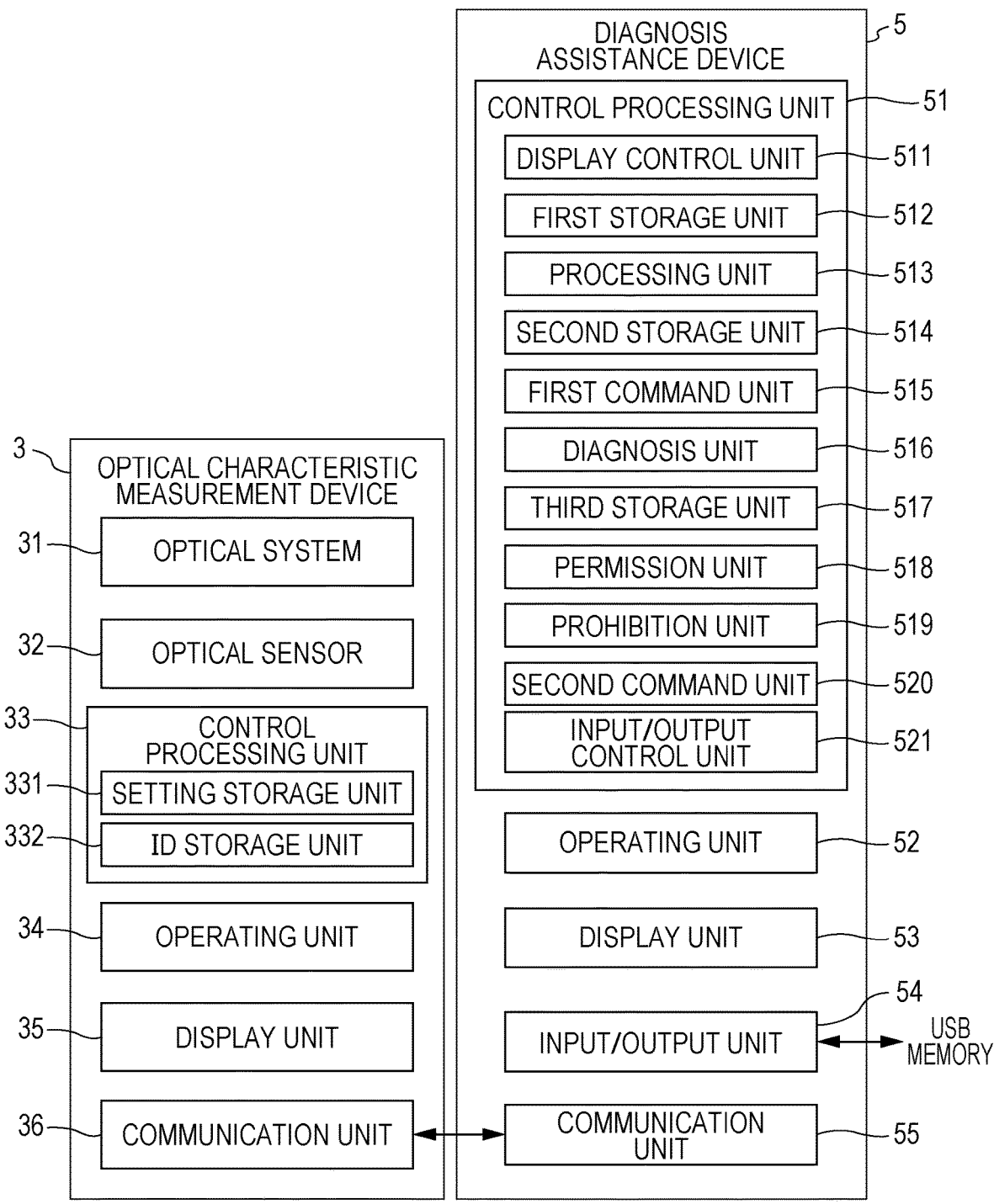
FIG. 1 is a block diagram showing a configuration of a diagnosis assistance device according to an embodiment and a configuration of an optical characteristic measurement device diagnosed by the device.

Hereinafter, one or more embodiments of the present invention will now be described with reference to the drawings. However, the scope of the invention is not limited to the disclosed embodiments.

In each drawing, the configurations denoted by the same reference numeral indicate that they are the same, and the description of the contents already described for the configurations will be omitted. In this specification, in the case of collectively referring to these configurations, these configurations are indicated by reference numerals without a suffix, and in the case of separately referring to these configurations, these configurations are indicated by reference numerals with a suffix.

An embodiment of a diagnosis assistance device (hereinafter, simply referred to as a diagnosis assistance device) of an optical characteristic measurement device will be described. FIG. 1 is a block diagram showing a configuration of a diagnosis assistance device 5 according to an embodiment and a configuration of an optical characteristic measurement device 3 diagnosed by the device. The diagnosis assistance device 5 and the optical characteristic measurement device 3 can communicate with each other in a wired or wireless manner. Examples of the wired manner may include a universal serial bus (USB) cable, a serial cable, and an Ethernet cable (Ethernet is a registered trademark). Examples of the wireless manner may include Bluetooth (registered trademark).

The optical characteristic measurement device 3 has a function of measuring a color of a measurement object using an optical sensor 32. The optical characteristic measurement device 3 includes an optical system 31, an optical sensor 32, a control processing unit 33, an operating unit 34, a display unit 35, and a communication unit 36.

The optical system 31 guides light emitted or reflected from a measurement object to the optical sensor 32. The optical sensor 32 receives the light and converts the received light into an electric signal. This electric signal is transmitted to the control processing unit 33. The control processing unit 33 uses the electric signal to calculate a value of color of the measurement object. In addition to this calculation function, the control processing unit 33 performs control and processing necessary for executing the functions of the optical characteristic measurement device 3.

Figure 12:
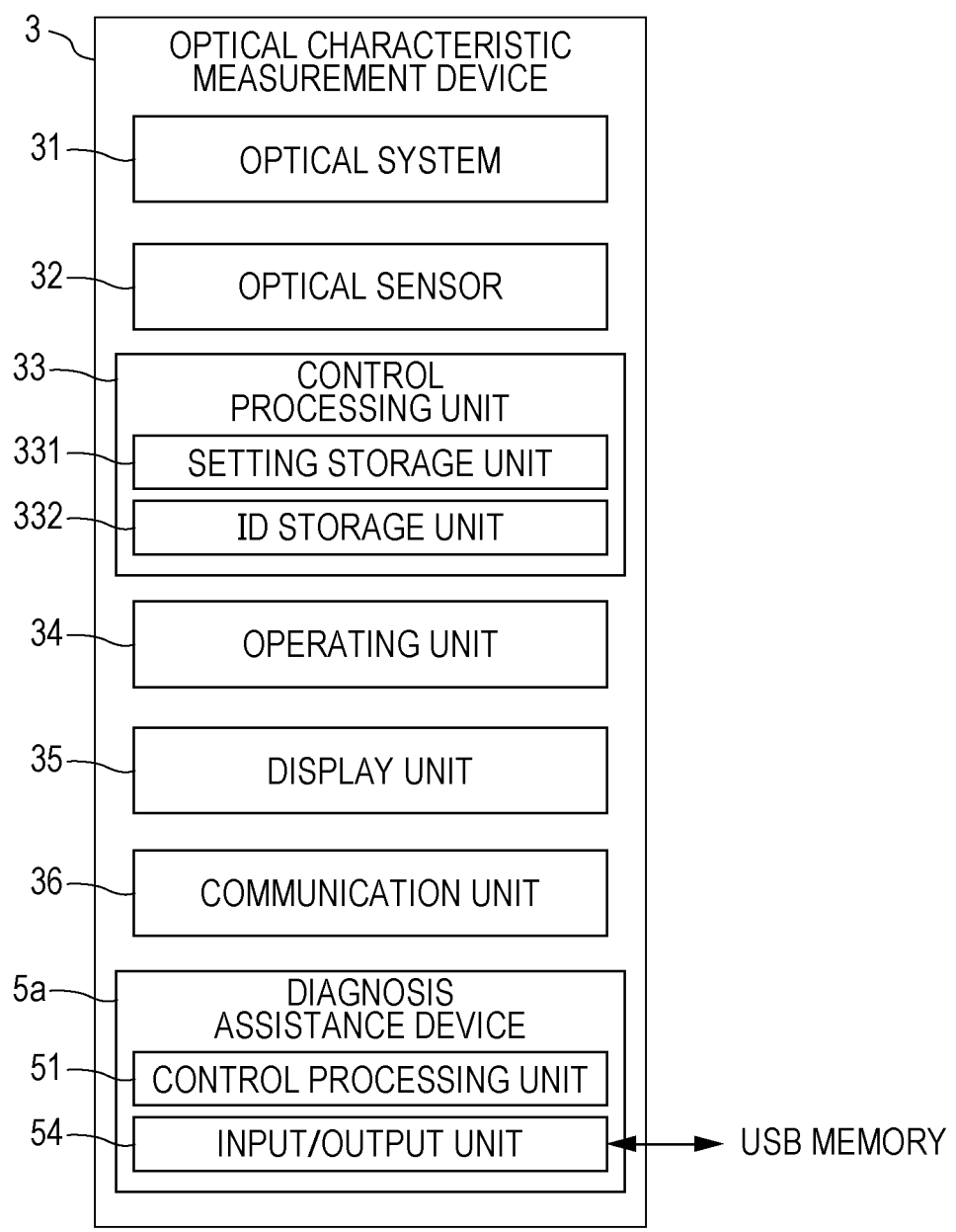
FIG. 12 is a block diagram showing a configuration of a diagnosis assistance device according to a modified example and a configuration of an optical characteristic measurement device diagnosed by the device.

The control processing unit 33 includes, for example, hardware such as a central processing unit (CPU), a random access memory (RAM), a read only memory (ROM), and a hard disk drive (HDD), programs and data for executing a function of the control processing unit 33, and the like. Some or all of the functions of the control processing unit 33 may be realized by a digital signal processor (DSP) instead of or in combination with the processing by the CPU. Likewise, some or all of the functions of the control processing unit 33 may be realized by processing by a dedicated hardware circuit instead of or in combination with the processing by software. As described above, the same also goes for a control processing unit 51 (FIGS. 1 and 12) to be described below and the control processing unit 33 (FIG. 12).

The control processing unit 33 includes a setting storage unit 331 and an ID storage unit 332 as functional blocks. These storage units are realized by a nonvolatile memory or the like.

The setting storage unit 331 stores one of first setting information and second setting information. The first setting information is information indicating the content to be set in the optical characteristic measurement device 3 when the optical characteristic measurement device 3 is diagnosed. The second setting information is information indicating the content to be set in the optical characteristic measurement device 3 when the optical characteristic measurement device 3 is used. The optical characteristic measurement device 3 is used to measure the color of the measurement object.

When the optical characteristic measurement device 3 is used, the setting storage unit 331 stores second setting information. The control processing unit 33 controls the optical characteristic measurement device 3 under the content of setting indicated by the second setting information to measure the color of the measurement object. When the optical characteristic measurement device 3 is diagnosed, the setting storage unit 331 stores the first setting information. The control processing unit 33 controls the optical characteristic measurement device 3 under the content of setting indicated by the first setting information to measure a color of a reference plate.

The ID storage unit 332 stores the ID of the optical characteristic measurement device 3. The serial number of the optical characteristic measurement device 3 is stored as an ID in the ID storage unit 332. The ID is not limited to the serial number as long as it is information which can specify one of a plurality of optical characteristic measurement devices.

The operating unit 34 is a device for a user to input commands, data, and the like to the optical characteristic measurement device 3. The operating unit 34 is realized by a hard key, a touch panel, or the like. When the user operates the operating unit 34, the setting is input when the optical characteristic measurement device 3 is used. The control processing unit 33 stores the content of setting (second setting information) in the setting storage unit 331.

The display unit 35 is a device for displaying the content of setting, a value of color measured by the optical characteristic measurement device 3, or the like. The display unit 35 is realized by a liquid crystal display, an organic electro luminescence (EL) display, or the like.

The communication unit 36 has a function of communicating with another device (here, the diagnosis assistance device 5). The communication unit 36 is realized by a communication interface.

The diagnosis assistance device 5 is a personal computer, and includes a control processing unit 51, an operating unit 52, a display unit 53, an input/output unit 54, and a communication unit 55. The control processing unit 51 performs control and processing necessary for executing the functions of the diagnosis assistance device 5.

The control processing unit 51 includes, as functional blocks, a display control unit 511, a first storage unit 512, a processing unit 513, a second storage unit 514, a first command unit 515, a diagnosis unit 516, a third storage unit 517, a permission unit 518, a prohibition unit 519, a second command unit 520, and an input/output control unit 521.

The display control unit 511 generates a screen and displays the screen on the display unit 53. The screen is, for example, a screen 2-1 shown in FIG. 2. The screen will be explained later.

The first storage unit 512 stores the first setting information in advance. The first storage unit 512 stores in advance the first setting information provided for each of the plurality of optical characteristic measurement devices. Therefore, the first storage unit 512 stores a plurality of pieces of first setting information. The optical characteristic measurement device 3 is included in a plurality of optical characteristic measurement devices. The IDs of each of the plurality of optical characteristic measurement devices and the first setting information of each of the plurality of optical characteristic measurement devices are stored in advance in the first storage unit 512 in association with each other.

The processing unit 513 acquires the second setting information stored in advance in the setting storage unit 331 from the setting storage unit 331 and stores the acquired second setting information in the second storage unit 514.

After the second setting information is stored in the second storage unit 514, the first command unit 515 issues a command (control) to store the first setting information stored in the first storage unit 512 in the setting storage unit 331.

The diagnosis unit 516 acquires a measurement result indicating a value measured by the optical characteristic measurement device 3 operated on the basis of the content of setting indicated by the first setting information stored in the setting storage unit 331, and generates information necessary for the diagnosis of the optical characteristic measurement device 3 using the acquired measurement result. The diagnosis means, for example, that the diagnosis unit 516 acquires a measurement result which is the value measured by the optical characteristic measurement device 3, generates information (for example, a comparison result shown in FIG. 10 and a trend of a measurement result shown in FIG. 11) necessary for the diagnosis of the optical characteristic measurement device 3 using the acquired measurement result, and provides the generated information to the user. The user looks at the information to determine whether the optical characteristic measurement device 3 can be used. The diagnosis is not limited to this meaning. For example, the diagnosis means that the diagnosis unit 516 acquires the measurement result, generates the information using the acquired measurement result, and determines whether the optical characteristic measurement device 3 can be used on the basis of the generated information. The diagnosis in the embodiment is a diagnosis with the former meaning.

The third storage unit 517 stores diagnosis data including the result diagnosed by the diagnosis unit 516. The diagnosis data is, for example, data shown in Table 1 to be described later.

When there are a plurality of optical characteristic measurement devices, the first setting information having different contents may be provided for each optical characteristic measurement device. If the first setting information provided for a certain optical characteristic measurement device is used for a diagnosis of another optical characteristic measurement device, an incorrect diagnosis is made. Therefore, the permission unit 518 is provided. The permission unit 518 determines whether the ID associated with the first setting information selected for diagnosis from the plurality of pieces of the first setting information (that is, the first setting information provided for each of the plurality of optical characteristic measurement devices) matches the ID of the optical characteristic measurement device to be diagnosed, before the optical characteristic measurement device (here, the optical characteristic measurement device 3) to be diagnosed among the plurality of optical characteristic measurement devices operates on the basis of the content of setting indicated by the first setting information stored in the setting storage unit 331. At the time of determining the matching of the IDs, the permission unit 518 permits the diagnosis unit 516 to diagnose the optical characteristic measurement device to be diagnosed. When the number of optical characteristic measurement device to be diagnosed is not plural but one, the permission unit 518 is unnecessary.

The prohibition unit 519 prohibits change of the content of setting of the optical characteristic measurement device 3 during the operation of the optical characteristic measurement device 3 on the basis of the content of setting indicated by the first setting information stored in the setting storage unit 331. For example, when the content of setting can be changed on the operation screen displayed on the display unit 35, the prohibition unit 519 remotely controls the operation screen displayed on the display unit 35 using the communication unit 55 and the communication unit 36 and locks the operation screen. This can prohibit the setting from being input. If a user's hand touches the operation screen displayed on the display unit 35 of the optical characteristic measurement device 3 during the operation of the optical characteristic measurement device 3 to change the content of setting, it is impossible to make a correct diagnosis. The prohibition unit 519 can prevent such a situation. By the user's attention, the event that the content of setting changes due to the touch by the user's hand on the operation screen during the operation of the optical characteristic measurement device 3 can be prevented. Therefore, the diagnosis assistance device 5 can also be provided without the prohibition unit 519.

After the diagnosis unit 516 acquires the measurement result, the second command unit 520 issues a command (control) to store the second setting information stored in the second storage unit 514 in the setting storage unit 331. The input/output control unit 521 will be described in the explanation part of the input/output unit 54.

The operating unit 52 is a device for a user to input commands, data, and the like to the diagnosis assistance device 5. The operating unit 52 is realized by a keyboard, a mouse, a touch panel, or the like. When the user operates the operating unit 52, the setting is input when the optical characteristic measurement device 3 is diagnosed. The control processing unit 51 stores the content of setting (first setting information) in the first storage unit 512.

The display unit 53 is a device for displaying an image, a screen, and the like generated by the display control unit 511. The display unit 53 is realized by a liquid crystal display, an organic electro luminescence (EL) display, or the like.

The input/output unit 54 is an input/output port through which the first setting information is output to the outside of the diagnosis assistance device 5 and the first setting information is input from the outside. For example, a USB memory can be connected to the input/output unit 54. The input/output control unit 521 commands the input/output unit 54 to output the first setting information stored in the first storage unit 512 to the outside, and stores the first setting information, which is input from the outside to the input/output unit 54, in the first storage unit 512.

The first setting information can be imported and exported by the input/output control unit 521 and the input/output unit 54. Therefore, for example, in order to prevent the first setting information from leaking from the diagnosis assistance device 5, the first setting information can be stored in the first storage unit 512 only when the diagnosis is executed.

After the input/output control unit 521 encrypts the first setting information, the input/output unit 54 outputs the first setting information to the outside. By doing so, even if the first setting information output to the outside is leaked, it is possible to prevent the content of the first setting information from being known. The known encryption processing can be used for encrypting the first setting information. When it is not necessary to import and export the first setting information, the input/output unit 54 and the input/output control unit 521 are unnecessary.

The communication unit 55 has a function of communicating with another device (here, the optical characteristic measurement device 3). The communication unit 55 is realized by a communication interface.

The optical characteristic measurement device 3 is provided with predetermined settings at the time of use and at the time of diagnosis, respectively. The setting items of the optical characteristic measurement device 3 will be described in detail. A first example of the setting items is a setting item for selecting whether to measure gloss. This is a setting item provided when the optical characteristic measurement device 3 has a function of simultaneously measuring colors and gloss. In the measurement of gloss, an appropriate measurement angle is determined according to the glossiness of the reference plate, so that the setting items for selecting measurement angles (for example, 20°, 60°, and 85°) are added.

A second example of the setting items is a setting item for selecting a color system (for example, XYZ color system and L*a*b* color system) of colors. When colors measured by the optical characteristic measurement device 3 are displayed as numerical values, the second example is a setting item provided when a color system can be selected from a plurality of color systems.

A third example of the setting items is a setting item for selecting the measurement angle of color. The third example is a setting item provided when the optical characteristic measurement device 3 can simultaneously measure colors from the plurality of angles. For example, one or more angles are selected from 15°, 45°, 75°, 105°, 135°, and 165°.

A fourth example of the setting items is a setting item for selecting whether regular reflected light is included in the measurement of the color. The fourth example is a setting item provided when the optical characteristic measurement device 3 can select either specular component exclude (SCE) or specular component include (SCI)

A fifth example of the setting items is a setting item for selecting a measurement diameter. The fifth example is a setting item provided when the optical characteristic measurement device 3 can select the measurement diameter. For example, any one of Φ 25.4 mm, Φ 8 mm, and 3×5 mm is selected.

A sixth example of the setting items is a setting item for selecting whether to monitor temperature. The sixth example is a setting item provided when the optical characteristic measurement device 3 has a function of monitoring the temperature in the optical characteristic measurement device 3. When the color is measured in the state in which the temperature in the optical characteristic measurement device 3 is high, the measurement accuracy is lowered. In the case in which the temperature in the optical characteristic measurement device 3 is selected to be monitored, when the temperature exceeds a predetermined value, the display control unit 511 displays a warning on the display unit 53.

It is assumed that the optical characteristic measurement device 3 has, for example, the second example and the third example as the setting items. For example, it is assumed that the XYZ color system is set in the setting items, and 45°, 105°, and 135° are set therein. These are the contents set in the optical characteristic measurement device 3.

As a premise for diagnosis of the optical characteristic measurement device 3, there is an initial setting. This will be explained. The initial setting includes (1) the input of the ID of the optical characteristic measurement device 3 to be diagnosed and the first setting information, (2) the measurement of the initial value, and (3) the input of the project name to be used by the optical characteristic measurement device 3.

Figure 2:
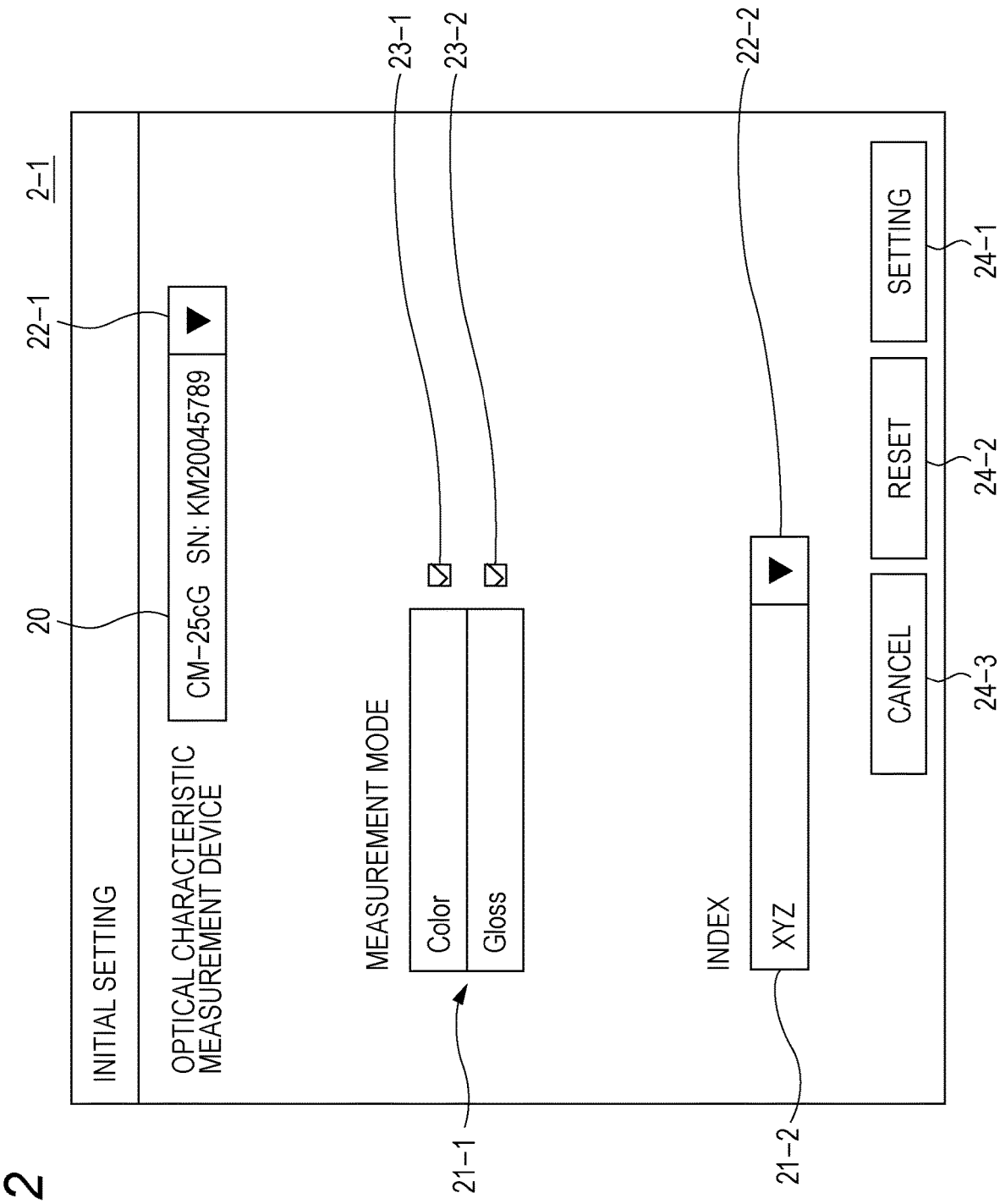
FIG. 2 is an explanatory diagram for explaining a first example of a screen to which an ID of an optical characteristic measurement device to be diagnosed and first setting information are input.

Referring to FIG. 1, when the user operates the operating unit 52 to input an initial setting command to the diagnosis assistance device 5, the display control unit 511 displays the screen for inputting the above (1) on the display unit 53. FIG. 2 is an explanatory diagram for explaining a first example of a screen 2 for inputting the above (1). The screen 2-1 of the first example includes an input column 20, a setting item column 21, a pull-down button 22, a check box 23, and a button 24.

As shown in FIGS. 1 and 2, the input column 20 is a column which inputs a model name and a serial number of the optical characteristic measurement device 3 to be diagnosed. In the initial screen 2-1, the input column 20 is blank. When the user operates the operating unit 52 to select the pull-down button 22-1, the display control unit 511 displays a list (not shown), which indicates the selectable optical characteristic measurement device, on the screen 2-1. When the user operates the operating unit 52 to select the optical characteristic measurement device 3 to be diagnosed from the list, the model name and the serial number of the selected optical characteristic measurement device 3 are input to the input column 20. The model name "CM-25cG" and the serial number "KM20045789" are shown in the input column 20. Therefore, the optical characteristic measurement device 3 having a model name "CM-25cG" and a serial number "KM20045789" is input as a diagnosis object. Since the optical characteristic measurement device 3 is specified by the serial number, the serial number functions as the ID of the optical characteristic measurement device 3.

Since the setting items are different according to the model of the optical characteristic measurement device 3, the setting item column 21 and the corresponding pull-down button 22 and check box 23 are not included in the initial screen 2-1. When the user inputs the optical characteristic measurement device 3 to be diagnosed to the input column 20, the display control unit 511 displays the setting item column 21, which corresponds to the model of the input optical characteristic measurement device 3, on the screen 2-1.

A setting item column 21-1 is a column for selecting any of a simultaneous measurement mode of color and gloss, a color measurement mode, and a gloss measurement mode in the diagnosis. The setting item column 21-1 is a first example of the setting items described above. The optical characteristic measurement device 3 indicated by the model name "CM-25cG" can select any of these three measurement modes. In the diagnosis, in the case of simultaneously measuring colors and gloss, the user operates the operating unit 52 to put a check into a check box 23-1 of a "Color" item and a check box 23-2 of a "Gloss" item. In the diagnosis, in the case of measuring color, the user operates the operating unit 52 to put a check into the check box 23-1 of the "Color" item. In the diagnosis, in the case of measuring gloss, the user operates the operating unit 52 to put a check into the check box 23-2 of the "Gloss" item. In the screen 2-1, since the check boxes 23-1 and 23-2 are checked, the simultaneous measurement mode of colors and gloss is selected.

For example, when the optical characteristic measurement device 3 is used for the measurement of gloss, it is not necessary to include the measurement of the color in the diagnosis of the optical characteristic measurement device 3. Therefore, in the setting item column 21-1, the gloss measuring mode can be selected.

There are a plurality of optical characteristic measurement devices 3 of the same model, and the measurement mode set at the time of use may be different. In such a case, the measurement mode set at the time of diagnosis is different. Therefore, the optical characteristic measurement device 3 of the same model can be distinguished by the ID (the serial number of the optical characteristic measurement devices 3 to be diagnosed) input to the input column 20.

The setting item column 21-2 is a column for selecting how to represent the measured value of color in the diagnosis and is blank before the selection. The setting item column 21-2 is the second example of the setting items described above. When the user operates the operating unit 52 to select the pull-down button 22-2, the display control unit 511 displays a list (not shown), which indicates the selectable color system, on the screen 2-1. When the user operates an operating unit 52 to select one of the color systems from the list, the selected display system is input to the setting item column 21-2. Since the XYZ is indicated in the setting item column 21-2 on a screen 2-1, the XYZ color system is input.

A button 24-1 is a setting button. When the input to the screen 2-1 is completed, the user operates the operating unit 52 to select the button 24-1. By doing so, the control processing unit 51 establishes items input to the input column 20, items checked in the setting item column 21-1 (setting item column 21), and items input to the setting item column 21-2 (setting item column 21). The items checked in the setting item column 21 and the items input to the setting item column 21 become information (first setting information) indicating the contents set in the optical characteristic measurement device 3 when the optical characteristic measurement device 3 is diagnosed.

A button 24-2 is a reset button. When the user operates the operating unit 52 to select the button 24-2 before the input of the screen 2-1 is completed (before the button 24-1 is selected), the display control unit 511 displays the initial screen 2-1 on the display unit 53. As described above, in the initial screen 2-1, the input column 20 is blank. The initial screen 2-1 does not include the setting item column 21, the pull-down button 22 corresponding to the setting item column 21, and the check box 23. The user can perform the above-mentioned input to the screen 2-1 again.

A button 24-3 is a cancel button. The cancel button is a button for termination without reflecting the change. Here, the contents input to the screen 2-1 are not reflected (ignored), so that the initial setting is terminated. That is, when the button 24-3 is selected, the display control unit 511 closes the screen 2-1. As a result, the initial setting is not executed.

Figure 3:
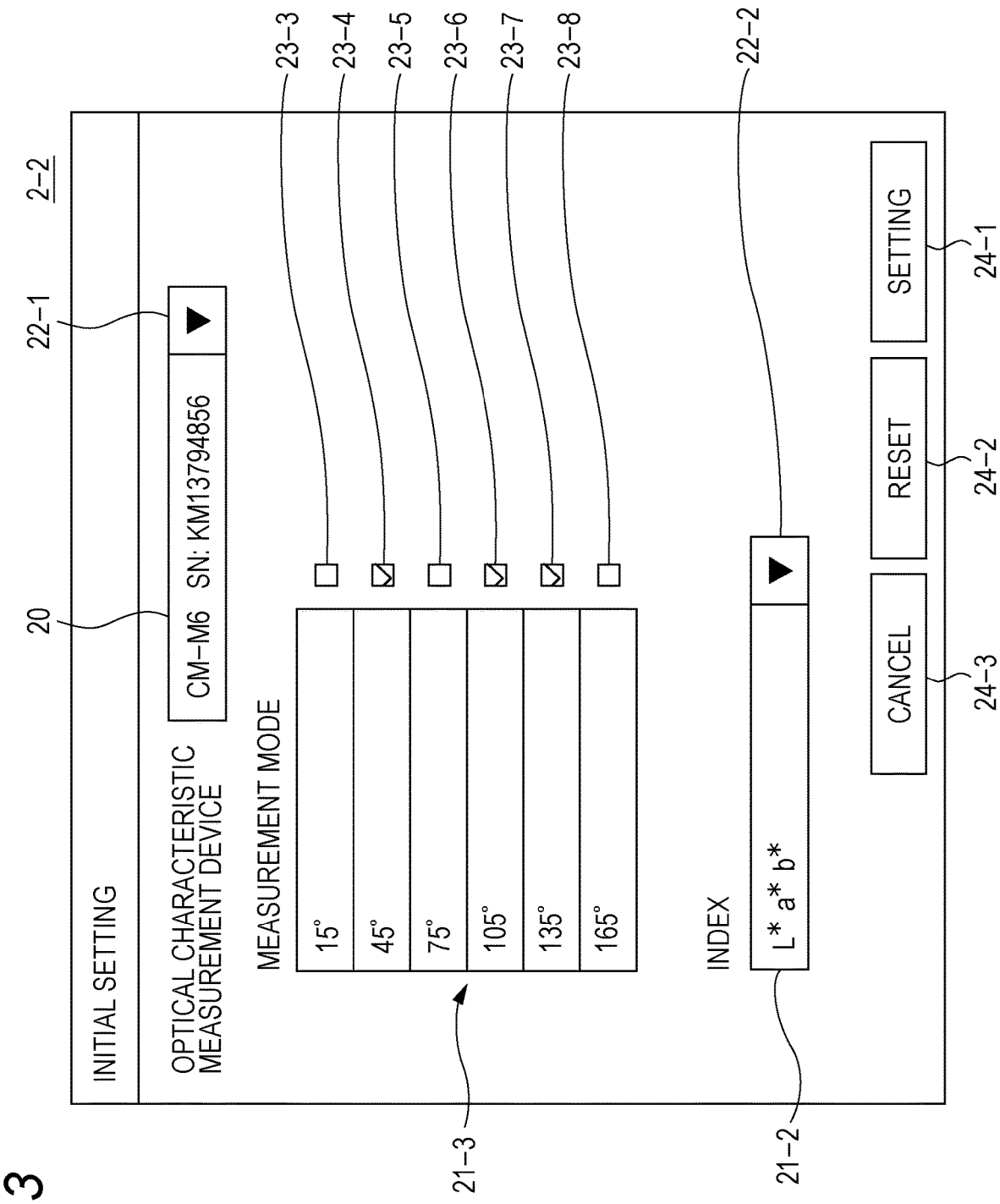
FIG. 3 is an explanatory diagram for explaining a second example of the screen to which the ID of the optical characteristic measurement device to be diagnosed and the first setting information are input.

FIG. 3 is an explanatory diagram for explaining a second example of the screen 2 for inputting the above item (1). A screen 2-2 of the second example is different from the screen 2-1 of the first example shown in FIG. 2 in that a setting item column 21-3 is arranged instead of the setting item column 21-1, and check boxes 23-3 to 23-8 are arranged instead of the check boxes 23-1 and 23-2.

A model name "CM-M6" and a serial number "KM13794856" are shown in the input column 20. Therefore, the optical characteristic measurement device 3 having a model name "CM-M6" and a serial number "KM13794856" is input as a diagnosis object. The optical characteristic measurement device 3 indicated by the model name "CM-M6" can simultaneously measure colors from multi angles (15°, 45°, 75°, 105°, 135°, and 165°).

Referring to FIGS. 1 and 3, when the user inputs the model name and the serial number of the optical characteristic measurement device 3 to be diagnosed to the input column 20, the display control unit 511 displays the setting item column 21 corresponding to the input model of the optical characteristic measurement device 3 on the screen 2-2. Here, the setting item column 21-3 and the corresponding check boxes 23-3 to 23-8 corresponding to the setting item column 21-3 and the setting item column 21-2 and the pull-down button 22-2 corresponding to the setting item column 21-2 are displayed on the screen 2-2.

The setting item column 21-3 is a third example of the setting items described above. When the check box 23-3 is checked, 15° is selected, when the check box 23-4 is checked, 45° is selected, when the check box 23-5 is checked, 75° is selected, when the check box 23-6 is checked, 105° is selected, when the check box 23-7 is checked, 135° is selected, and when the check box 23-8 is checked, 165° is selected. In the screen 2-2, since the check boxes 23-4, 23-6, and 23-7 are checked, 45°, 105°, and 135° are selected.

In the screen 2-2, since L*a*b* are shown in the setting item column 21-2, the L*a*b* color system is input.

The items checked in the setting item column 21-3 and the items input to the setting item column 21-2 become information (first setting information) indicating the contents set in the optical characteristic measurement device 3 when the optical characteristic measurement device 3 is diagnosed.

Figure 4:
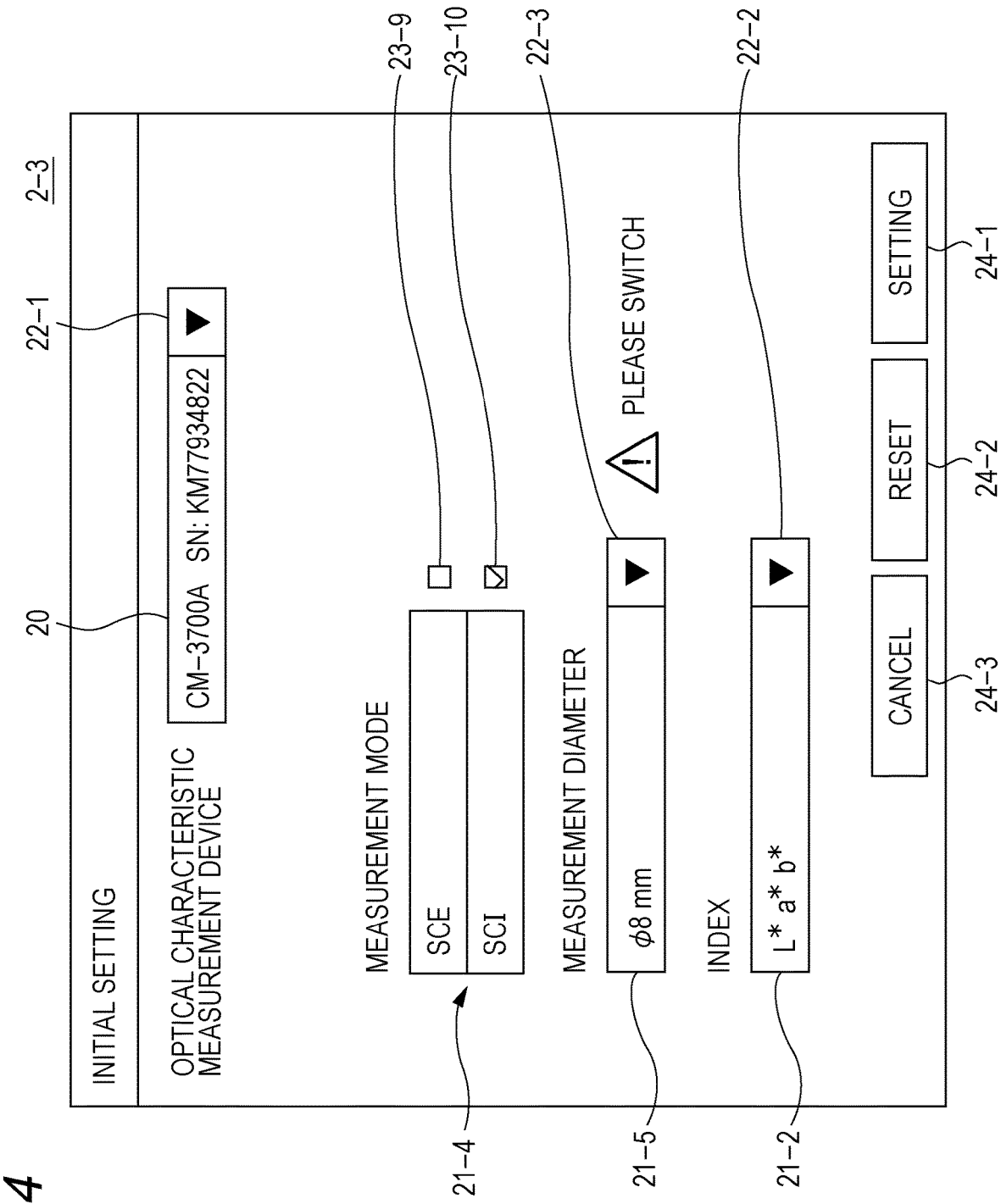
FIG. 4 is an explanatory diagram for explaining a third example of the screen to which the ID of the optical characteristic measurement device to be diagnosed and the first setting information are input.

FIG. 4 is an explanatory diagram for explaining a third example of the screen 2 for inputting the above item (1). A screen 2-3 of the third example is different from the screen 2-1 of the first example shown in FIG. 2 in that setting item columns 21-4 and 21-5 are arranged instead of the setting item column 21-1, check boxes 23-9 and 23-10 are arranged instead of the check boxes 23-1 and 23-2, and a pull-down button 22-3 is also arranged as the pull-down button 22.

A model name "CM-3700A" and a serial number "KM77934822" are shown in the input column 20. Therefore, the optical characteristic measurement device 3 having a model name "CM-3700A" and a serial number "KM77934822" is input as a diagnosis object. The optical characteristic measurement device 3 indicated by the model name "CM-3700A" can select either SCE or SCI to measure color.

Referring to FIGS. 1 and 4, when the user inputs the model name and the serial number of the optical characteristic measurement device 3 to be diagnosed to the input column 20, the display control unit 511 displays the setting item column 21 corresponding to the input model of the optical characteristic measurement device 3 on the screen 2-3. Here, the setting item column 21-4 and the corresponding check boxes 23-9 and 23-10 corresponding to the setting item column 21-4, the setting item column 21-5 and the pull-down button 22-3 corresponding to the setting item column 21-5, and the setting item column 21-2 and the pull-down button 22-2 corresponding to the setting item column 21-2 are displayed on the screen 2-3.

The setting item column 21-4 is a fourth example of the setting items described above. When the check box 23-9 is checked, the SCE is selected, and when the check box 23-10 is checked, the SCI is selected. In the screen 2-3, since the check box 23-10 is checked, the SCI is selected.

The optical characteristic measurement device 3 indicated by the model name "CM-3700A" can select a measurement diameter to measure color. The setting item column 21-5 is the fifth example of the setting items described above. When the user operates the operating unit 52 to select the pull-down button 22-3, the display control unit 511 displays a list (not shown), which indicates the selectable measurement diameter, on the screen 2-3. When the user operates the operating unit 52 to select one of the measurement diameters from the list, the selected measurement diameter is input to the setting item column 21-5. In the screen 2-3, since Φ 8 mm is indicated in the setting item column 21-5, Φ 8 mm is input.

In the case of the optical characteristic measurement device 3 indicated by the model name "CM-3700A", the user should fit an attachment (not shown) corresponding to the measurement diameter to an attachment fitting part (not shown) provided in the optical characteristic measurement device 3. There are three types of attachments (attachment for Φ 25.4 mm, attachment for Φ 8 mm, attachment for 3×5 mm). Each of these attachments is provided with a terminal. The terminal comes into contact with the terminal of the attachment fitting part when the attachment is fitted to the attachment fitting part. The position of the terminal of the attachment differs for each type of attachment. By doing so, when the attachment is fitted to the attachment fitting part, the optical characteristic measurement device 3 can recognize the type of attachments.

If the measurement diameter set in the setting item column 21-5 is different from the measurement diameter of the attachment fitted to the attachment fitting part of the optical characteristic measurement device 3, the correct measurement cannot be performed. Therefore, the diagnosis assistance device 5 and the optical characteristic measurement device 3 communicate with each other using the communication unit 55 and the communication unit 36, and the diagnosis assistance device 5 acquires the measurement diameter of the attachment fitted to the attachment fitting part of the optical characteristic measurement device 3. The control processing unit 51 determines whether the measurement diameter indicated by the acquired information is different from the measurement diameter set in the setting item column 21-5. When the different determination is made, the diagnosis assistance device 5 issues a warning to the user. For example, the display control unit 511 displays a character image indicating "Please switch the attachment" on the screen 2-3.

In the screen 2-3, since L*a*b* are shown in the setting item column 21-2, the L*a*b* color system is input.

The items checked in the setting item column 21-4, the items input to the setting item column 21-5, and the items input to the setting item column 21-2 become information (first setting information) indicating the contents set in the optical characteristic measurement device 3 when the optical characteristic measurement device 3 is diagnosed.

The input (input of the ID of the optical characteristic measurement device 3 to be diagnosed and the first setting information) of the above (1) is described above.

Next, the measurement of the initial value (the above (2)) will be described. This will be explained by taking the screen 2-2 shown in FIG. 3 as an example. Referring to FIGS. 1 and 3, when the user operates the operating unit 52 to select the button 24-1, the control processing unit 51 establishes the items input to the input column 20, the items checked in the setting item column 21-3, and the items input to the setting item column 21-2. Then, the display control unit 511 displays a screen (not shown) including a character image of "Please measure the color of the reference plate using the optical characteristic measurement device (CM-M6 SN:KM13794856)" on the display unit 53.

The user measures the color of the reference plate using the optical characteristic measurement device 3 having a model name "CM-M6" and a serial number "KM13794856". In the screen 2-2, since the check boxes 23-4, 23-6, and 23-7 are checked, the optical characteristic measurement device 3 measures values of colors indicated by reflected light at 45°, 105°, and 135°. The values of color measured at this time become initial values. The control processing unit 51 stores the initial value. Here, the initial value of color indicated by the reflected light at 45°, the initial value of color indicated by the reflected light at 105°, and the initial value of color indicated by the reflected light at 135° are stored in the control processing unit 51.

Figure 5:
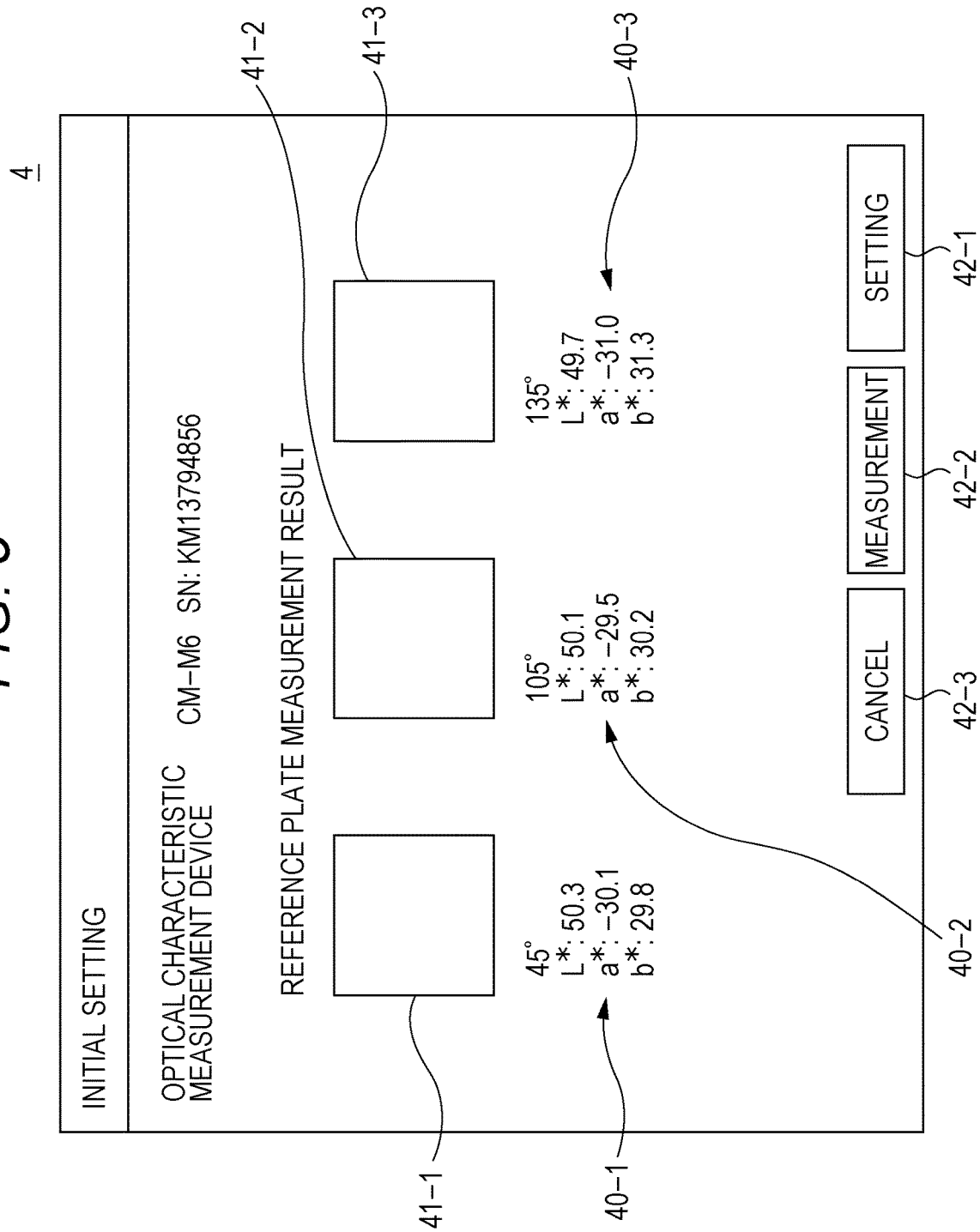
FIG. 5 is an explanatory diagram for explaining an example of a screen displaying an initial value.

The display control unit 511 displays the screen displaying the initial value on the display unit 53. FIG. 5 is an explanatory diagram for explaining an example of a screen 4 displaying the initial value. The screen 4 includes an initial value 40, an image 41 visualizing a color indicated by the initial value 40, and a button 42.

An initial value 40-1 is the initial value of color indicated by the reflected light at 45°. An initial value 40-2 is the initial value of color indicated by the reflected light at 105°. An initial value 40-3 is the initial value of color indicated by the reflected light at 135°. In the screen 2-2 shown in FIG. 3, since the L*, a*, and b* are input to the setting item column 21-2, the values of colors are indicated by the L*a*b* color system.

The image 41-1 is an image visualizing a value of color indicated by the initial value 40-1. The image 41-2 is an image visualizing a value of color indicated by the initial value 40-2. The image 41-3 is an image visualizing a value of color indicated by the initial value 40-3. Since the reference plate is a green color tile, the images 41-1 to 41-3 indicate green. Since the initial values 40-1 to 40-3 are different from each other, the green color indicated by the image 41-1, the green color indicated by the image 41-2, and the green color indicated by the image 41-3 are slightly different from each other.

A button 42-1 is a setting button. When the user operates the operating unit 52 to select the button 42-1, the control processing unit 51 sets the initial value 40-1 as the initial value of color indicated by the reflected light at 45°, the initial value 40-2 as the initial value of color indicated by the reflected light at 105°, and the initial value 40-3 as the initial value of color indicated by the reflected light at 135°, respectively.

A button 42-2 is a re-measurement button. The user looks at the screen 4 to determine whether there is a need to perform the measurement again. For example, when the color indicated by the image 41 is white, it is found that the color of the white reference plate is incorrectly measured. In such a case, when the user operates the operating unit 52 to select the button 42-2, the display control unit 511 displays a screen (not shown) including a character image of "Please measure the color of the reference plate using the optical characteristic measurement device (CM-M6 SN:KM13794856)" on the display unit 53. The user can again measure the color of the reference plate using the optical characteristic measurement device 3.

A button 42-3 is a cancel button. When the button 42-3 is selected, the display control unit 511 closes the screen 4. As a result, the initial setting is not executed.

Figure 6:
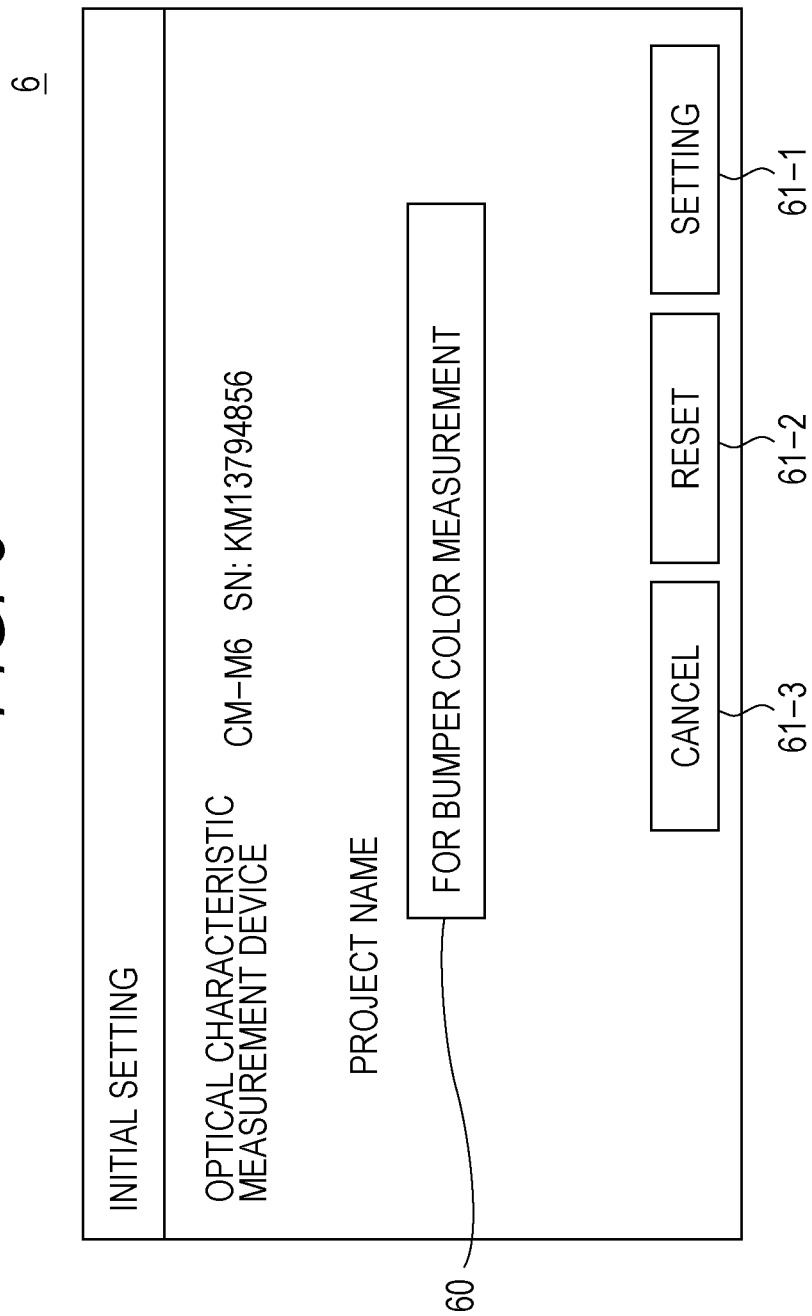
FIG. 6 is an explanatory diagram for explaining an example of a screen for inputting a project name.

Next, an input of a project name (the above (3)) in which the optical characteristic measurement device 3 is used will be described. Referring to FIGS. 1 and 5, when the user operates the operating unit 52 to select the button 42-1, the control processing unit 51 sets the initial value. The display control unit 511 displays the screen for inputting the project name on the display unit 53. FIG. 6 is an explanatory diagram for explaining an example of a screen 6 for inputting a project name. The screen 6 includes a project name input column 60 and a button 61.

The user inputs the project name in which the optical characteristic measurement device 3 having a model name "CM-M6" and a serial number "KM13794856" is used. When the optical characteristic measurement device 3 is used for measuring the color of the automobile bumper, the user operates the operating unit 52 to input, for example, "for bumper color measurement" to the project name input column 60.

A button 61-1 is a setting button. When the user operates the operating unit 52 to select the button 61-1, the control processing unit 51 establishes the project name input to the project name input column 60.

A button 61-2 is a reset button. When the user operates the operating unit 52 to select the button 61-2 before the input of the screen 6 is completed (before the button 61-1 is selected), the display control unit 511 displays the initial screen 6 on the display unit 53. In the initial screen 6, the project name input column 60 is blank. The user can input the project name to the project name input column 60 again.

A button 61-3 is a cancel button. When the button 61-3 is selected, the display control unit 511 closes the screen 6. As a result, the initial setting is not executed.

Figure 7:
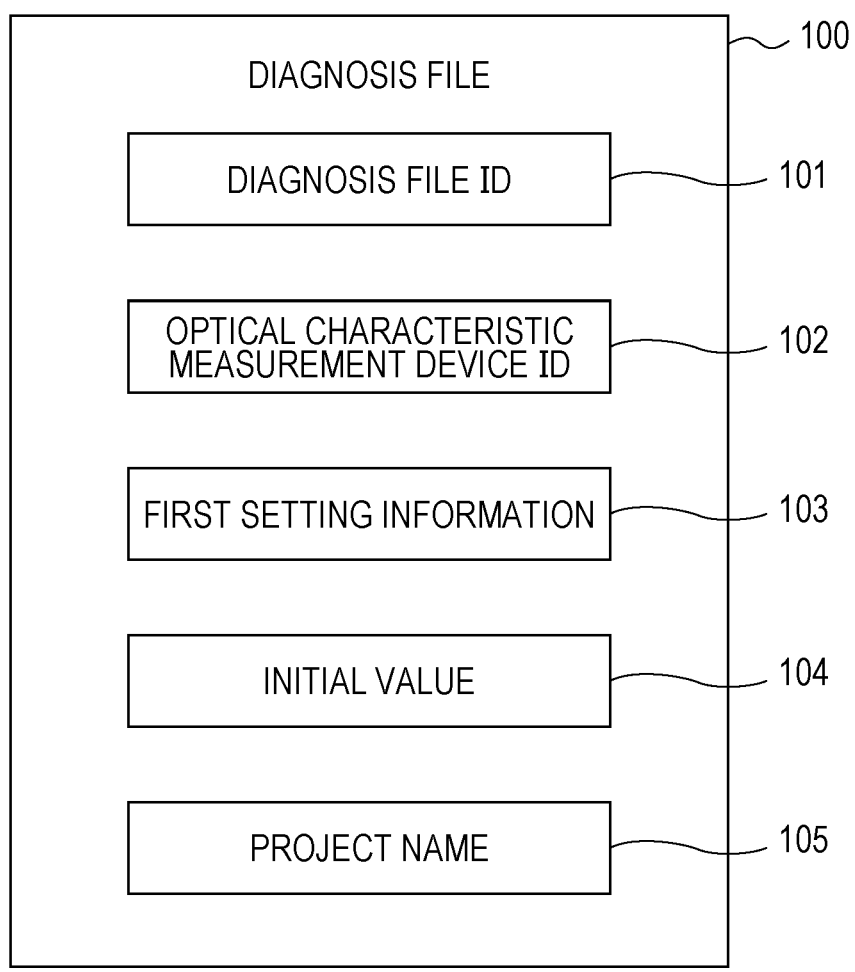
FIG. 7 is an explanatory diagram for explaining an example of a diagnosis file.

Referring to FIGS. 1 and 6, when the user operates the operating unit 52 to select the button 61-1, the control processing unit 51 generates a diagnosis file. FIG. 7 is an explanatory diagram for explaining an example of the diagnosis file. A diagnosis file 100 includes a diagnosis file ID 101, an optical characteristic measurement device ID 102, first setting information 103, an initial value 104, and a project name 105.

The diagnosis file ID 101 is an ID for distinguishing the diagnosis file 100 from other diagnosis files. The control processing unit 51 includes an ID generation unit (not shown), and generates the diagnosis file ID to be allocated to the generated diagnosis file each time a diagnosis file is generated.

The optical characteristic measurement device ID 102 is the ID of the optical characteristic measurement device (in this case, the optical characteristic measurement device 3) to be diagnosed. The optical characteristic measurement device ID 102 is the serial number of the optical characteristic measurement device established by the control processing unit 51 in the above (1). Here, the optical characteristic measurement device ID 102 is the serial number input to the input column 20 of FIG. 3.

The first setting information 103 is the items established by the control processing unit 51 in the above (1). Here, the items established by the control processing unit 51 are the items checked in the setting item column 21-3 in FIG. 3 and the items input to the setting item column 21-2.

The initial value 104 is the initial value established by the control processing unit 51 in the above (2). Here, the initial value 104 is the initial value 40 shown in FIG. 5.

The project name 105 is the project name established by the control processing unit 51 in the above (3). Here, the project name 105 is the project name input to the project name input column 60 of FIG. 6.

The control processing unit 51 stores the diagnosis file 100 in the first storage unit 512. Since the diagnosis file 100 includes the optical characteristic measurement device ID 102 and the first setting information 103, the optical characteristic measurement device ID 102 and the first setting information 103 are stored in the first storage unit 512 in association with each other. Therefore, when the plurality of diagnosis files are stored in the first storage unit 512, the IDs of each of the plurality of optical characteristic measurement devices and the first setting information of each of the plurality of optical characteristic measurement devices are stored in the first storage unit 512 in association with each other.

The above is the explanation of the initial setting.

Figure 8:
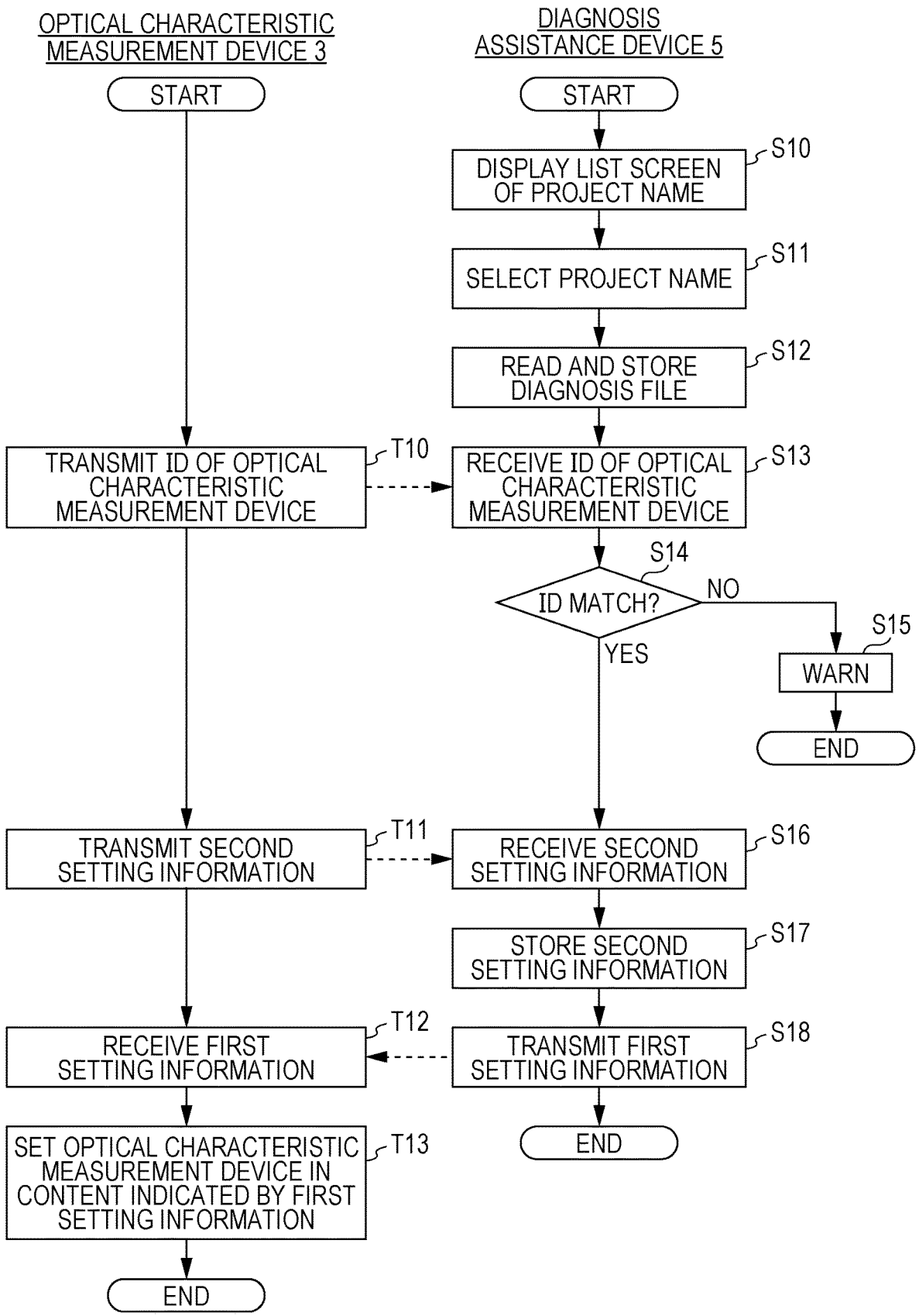
FIG. 8 is a diagram showing a first half of a flowchart for explaining the diagnosis of the optical characteristic measurement device.
Figure 9:
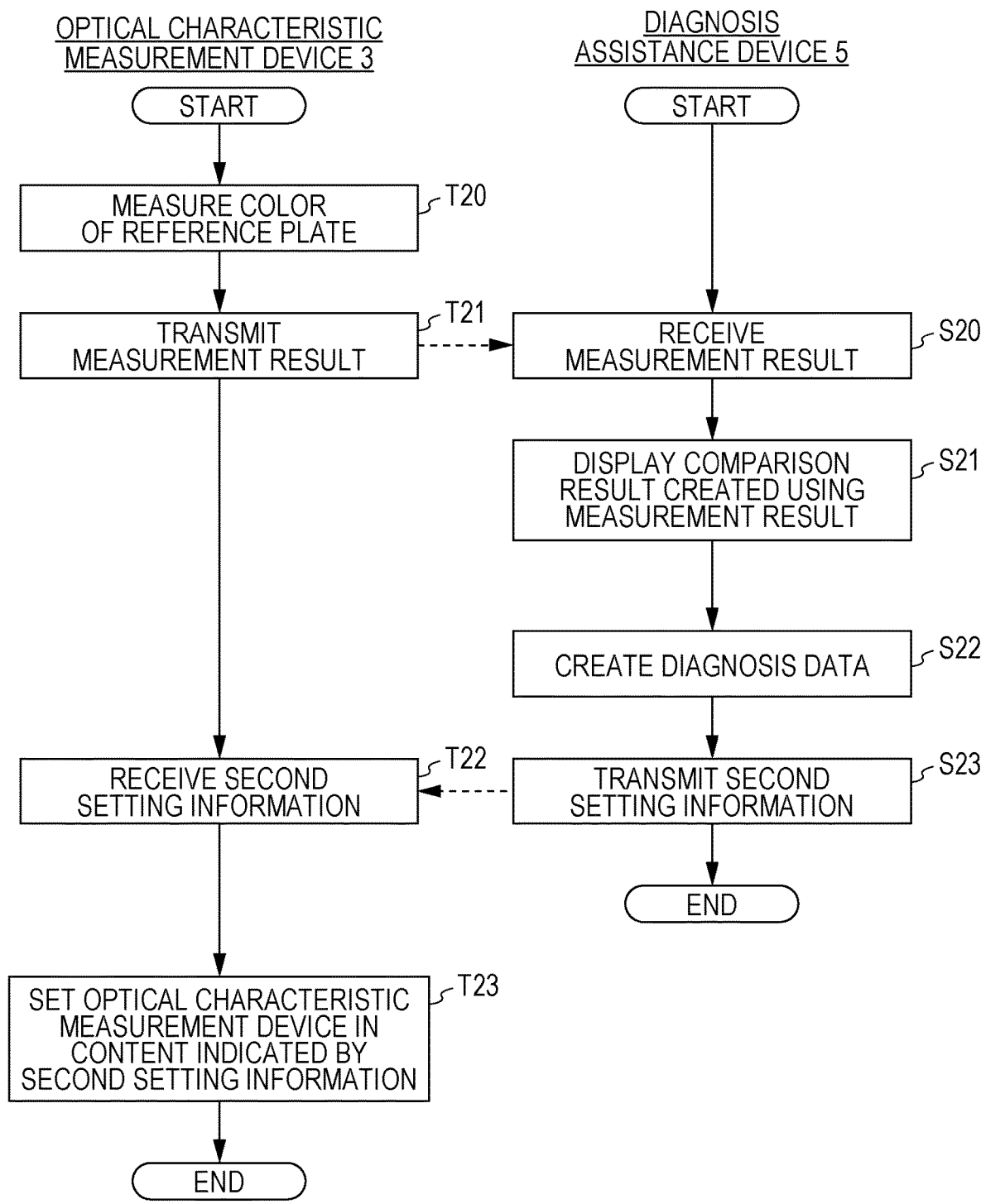
FIG. 9 is a diagram showing a second half of a flowchart for explaining the diagnosis of the optical characteristic measurement device.

Next, the diagnosis will be described. FIGS. 8 and 9 are flowcharts for explaining the diagnosis. Referring to FIGS. 1 and 8, the user operates the operating unit 52 to input a command for calling up a diagnosis function. The control processing unit 51 extracts the project name from the diagnosis file stored in the first storage unit 512. The display control unit 511 displays a list screen (not shown) showing a list of the extracted project names on the display unit 53 (step S10). For example, three diagnosis files are stored in the first storage unit 512, the project name is "for bumper color measurement" in a first diagnosis file (diagnosis file 100 shown in FIG. 7), the project name is "for body color measurement" in a second diagnosis file, and the project name is "for dashboard measurement" in a third diagnosis file. In this case, since the "for bumper color measurement", the list screen includes "for body color measurement", and the "for dashboard measurement" are extracted as the project names, a character image indicating the "for bumper color measurement", a character image indicating the "for body color measurement", and a character image indicating the "for dashboard measurement" are provided.

The user operates the operating unit 52 to select the project name to be used for the optical characteristic measurement device to be diagnosed from the list screen (step S11). For example, it is assumed that the character image indicating the "for bumper color measurement" is selected. The control processing unit 51 reads out and stores the diagnosis file (diagnosis file 100) including the "for bumper color measurement" from the diagnosis files stored in the first storage unit 512 (step S12).

The diagnosis assistance device 5 and the optical characteristic measurement device 3 communicate with each other using the communication unit 55 and the communication unit 36, and the communication unit 36 transmits the ID stored in the ID storage unit 332 of the optical characteristic measurement device 3 (step T10). The ID is constituted of the serial number of the optical characteristic measurement device 3. The communication unit 55 receives the transmitted ID (step S13). The communication unit 55 transmits the received ID to the permission unit 518. As a result, the permission unit 518 acquires the ID stored in the ID storage unit 332.

The permission unit 518 determines whether the acquired ID matches the optical characteristic measurement device ID 102 included in the diagnosis file 100 read in step S12 (step S14). That is, the permission unit 518 determines whether the optical characteristic measurement device ID 102 (the ID associated with the first setting information selected for the diagnosis) included in the diagnosis file 100 matches the ID of the optical characteristic measurement device 3 to be diagnosed before the optical characteristic measurement device 3 to be diagnosed among the plurality of optical characteristic measurement devices is operated on the basis of the content of setting indicated by the first setting information stored in the setting storage unit 331.

When the permission unit 518 determines that the IDs do not match (No in step S14), the diagnosis assistance device 5 does not execute the diagnosis of the optical characteristic measurement device 3. The diagnosis assistance device 5 issues a warning to call the user's attention (step S15). For example, the display control unit 511 displays, on the display unit 53, a screen including a character image indicating "Please connect CM-M6 SN:KM13794856 to the diagnosis assistance device 5" by using the optical characteristic measurement device ID 102 included in the diagnosis file 100 read in step S12.

When the permission unit 518 determines that the IDs match (Yes in step S14), the permission unit 518 permits the diagnosis unit 516 to diagnose the optical characteristic measurement device 3. Then, the processing unit 513 acquires the second setting information from the optical characteristic measurement device 3. This will be described in detail. As described above, the second setting information is information indicating the content to be set in the optical characteristic measurement device 3 when the optical characteristic measurement device 3 is used. Here, it is assumed that reflection angles of 45° and 135° are set and the L*a*b* color system is set. The reflection angles (45° and 135°) set when the optical characteristic measurement device 3 is used are different from the reflection angles (45°, 105°, and 135°) set when the optical characteristic measurement device 3 is diagnosed.

The processing unit 513 issues a command to acquire the second setting information. By doing so, the diagnosis assistance device 5 and the optical characteristic measurement device 3 communicate with each other using the communication unit 55 and the communication unit 36, and the communication unit 36 transmits the second setting information stored in the setting storage unit 331 (step T11). The communication unit 55 receives the transmitted second setting information (step S16). The processing unit 513 stores the second setting information in the second storage unit 514 (step S17).

The first command unit 515 issues a command to store the first setting information 103 included in the diagnosis file 100 read in step S12 in the setting storage unit 331. The first setting information 103 is information in which the reflection angle is 45°, 105°, and 135°, and the color system is the L*a*b* color system (FIG. 3). By doing so, the diagnosis assistance device 5 and the optical characteristic measurement device 3 communicate with each other using the communication unit 55 and the communication unit 36, and the communication unit 55 transmits the first setting information 103 (step S18).

The communication unit 36 receives the transmitted first setting information 103 (step T12). The control processing unit 33 stores the first setting information 103 in the setting storage unit 331. As a result, the optical characteristic measurement device 3 is set in the content indicated by the first setting information 103 (step T13).

Referring to FIGS. 1 and 9, the user measures the color of the reference plate using the optical characteristic measurement device 3 (step T20).

When the measurement of the color of the reference plate using the optical characteristic measurement device 3 is completed, the diagnosis unit 516 acquires the measurement result (the measured value of color). This will be described in detail. The diagnosis assistance device 5 and the optical characteristic measurement device 3 communicate with each other using the communication unit 55 and the communication unit 36, and the communication unit 36 transmits the measurement result (step T21). The communication unit 55 receives the transmitted measurement result (step S20). The diagnosis unit 516 acquires the measurement result received in step S20.

The diagnosis unit 516 generates a comparison result by using the acquired measurement result and the initial value 104 (FIG. 7) included in the diagnosis file 100 read in step S12 (FIG. 8). The display control unit 511 displays a screen displaying the comparison result on the display unit 53 (step S21).

Figure 10:
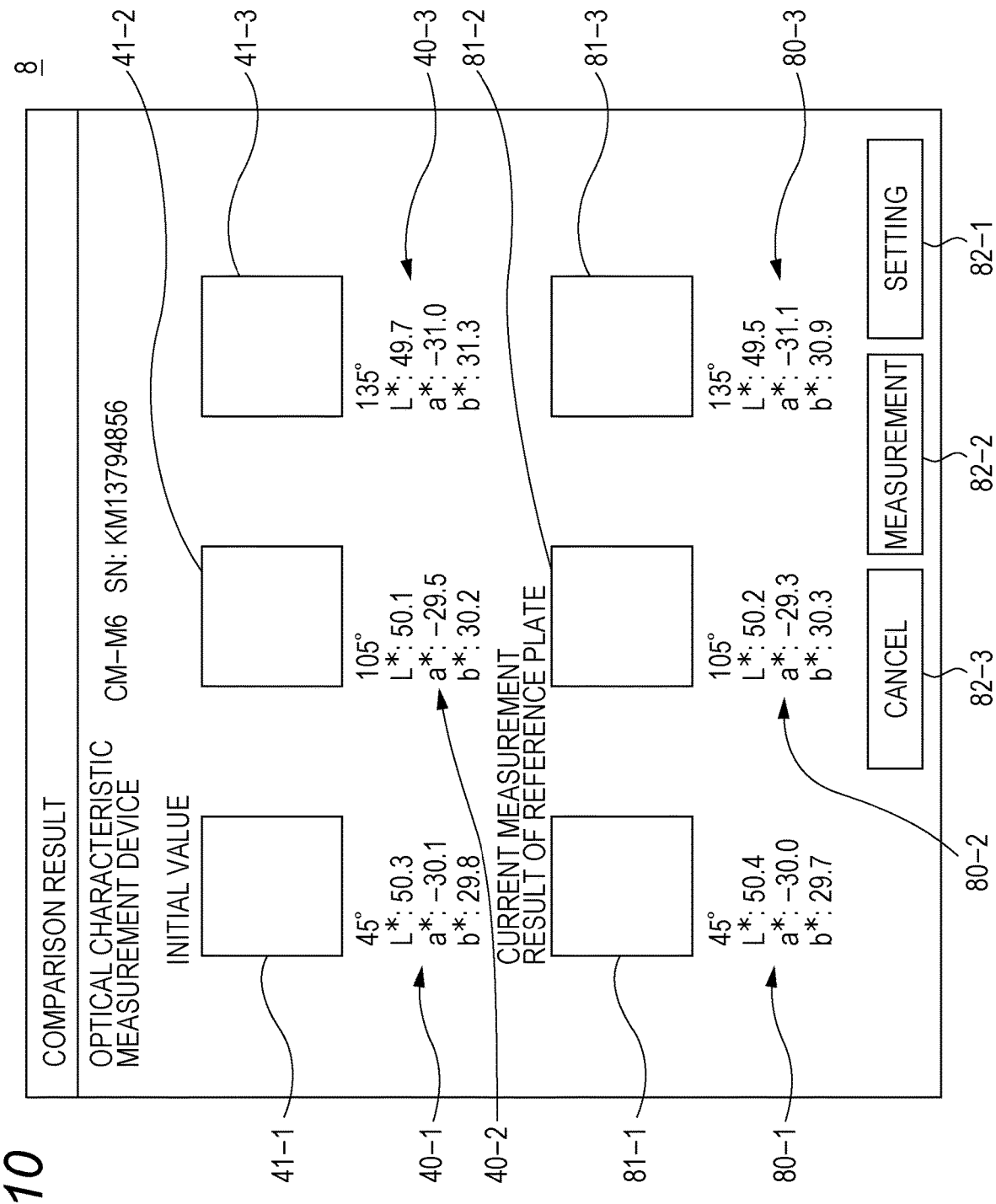
FIG. 10 is an explanatory diagram for explaining an example of a screen displaying a comparison result.

FIG. 10 is an explanatory diagram for explaining an example of a screen 8 displaying a comparison result. The screen 8 includes the initial value 40, the image 41 visualizing the color indicated by the initial value 40, a measurement result (a measured value of color) 80, an image 81 visualizing the color indicated by the measurement result, and a button 82.

The initial value 40 and the image 41 are the initial value 40 and the image 41 shown in FIG. 5.

The measurement result 80-1 is the value of color indicated by the reflected light at 45° in the measurement in step T20. The measurement result 80-2 is the value of color indicated by the reflected light at 105°. The measurement result 80-3 is the value of color indicated by the reflected light at 135°. Since the color system included in the first setting information 103 (FIG. 7) is the L*a*b* color system, the measurement result 80 are indicated by the L*a*b* color system.

The image 81-1 is an image visualizing a value of color indicated by the measurement result 80-1. The image 81-2 is an image visualizing a value of color indicated by the measurement result 80-2. The image 81-3 is an image visualizing a value of color indicated by the measurement result 80-3. Since the reference plate is a green color tile, the images 81-1 to 81-3 indicate green. Since the measurement results 80-1 to 80-3 are different from each other, the green color indicated by the image 81-1, the green color indicated by the image 81-2, and the green color indicated by the image 81-3 are slightly different from each other.

When the color indicated by the image 81 is, for example, white, the user looks at the image 81 to find that the color of the reference plate to be measured is incorrect.

Instead of the initial value 40 and the image 41, the screen 8 may include the measurement result measured by the previous diagnosis and the image visualizing the value of color indicated by the measurement result.

A button 82-1 is a completion button (setting button). When the user operates the operating unit 52 to select the button 82-1, the diagnosis unit 516 creates diagnosis data in which the measurement result received in step S20 is associated with the diagnosis file, and stores the diagnosis data in the third storage unit 517 (step S22).

TABLE 1

| Project No | name | Diagnosis file ID | Optical characteristic measurement device ID | Index | 45° | 105° | 135° |
|---|---|---|---|---|---|---|---|
| 1 | For bumper color measurement | prj0001 | KM13794856 | L*a*b* | 50.3 −30.1 29.8 | 50.1 −29.5 30.2 | 49.7 −31.0 31.3 |
| 2 | For bumper color measurement | prj0001 | KM13794856 | L*a*b* | 50.4 −30.0 29.7 | 50.2 −29.3 30.3 | 49.5 −31.1 30.9 |

Table 1 shows an example of diagnosis data. The diagnosis data is associated with the diagnosis file 100 shown in FIG. 7. The project name, the diagnosis file ID, the optical characteristic measurement device ID, an index (color system), 45°, 105°, and 135° in Table 1 each are the project name 105, the diagnosis file ID 101, the optical characteristic measurement device ID 102, the color system included in the first setting information 103, and the angle of the reflected light included in the first setting information 103.

The values of 45°, 105°, and 135° in the column indicated by No. 1 are the initial value 104 (initial value 40 shown in FIG. 10) shown in FIG. 7. The values of 45°, 105°, and 135° in the column indicated by No. 2 are the measurement result 80 shown in FIG. 10.

Referring to FIGS. 1 and 10, the button 82-2 is a re-measurement button. The user looks at the screen 8 to determine whether there is a need to perform the measurement again. For example, when the color indicated by the image 81 is white, it is found that the color of the white reference plate is incorrectly measured. In such a case, when the user operates the operating unit 52 to select the button 82-2, the display control unit 511 displays the screen (not shown) including the character image of "Please measure the color of the reference plate using the optical characteristic measurement device (CM-M6 SN:KM13794856)" on the display unit 53. The user can again measure the color of the reference plate using the optical characteristic measurement device 3.

A button 82-3 is a cancel button. After the button 82-1 is selected and the diagnosis unit 516 creates the diagnosis data (Table 1), when the user operates the operating unit 52 to select the button 82-3, the diagnosis data is canceled. The user can again measure the color of the reference plate using the optical characteristic measurement device 3 having the model name "CM-M6" and the serial number "KM13794856".

Referring to FIGS. 1 and 9, after the diagnosis data is created in step S22 (in other words, after the diagnosis unit 516 acquires the measurement result received in step S20), the second command unit 520 reads the second setting information stored in the second storage unit 514 and issues a command to transmit the second setting information to the optical characteristic measurement device 3. This will be described in detail. The second setting information is stored in the second storage unit 514 in step S17 (FIG. 8). The second setting information is information in which the reflection angle is 45° and 135°, and the color system is the L*a*b* color system. The diagnosis assistance device 5 and the optical characteristic measurement device 3 communicate with each other using the communication unit 55 and the communication unit 36, and the communication unit 55 transmits the second setting information (step S23).

The communication unit 36 receives the transmitted second setting information (step T22). The control processing unit 33 stores the second setting information in the setting storage unit 331. As a result, the optical characteristic measurement device 3 is set in the content indicated by the second setting information (step T23). Therefore, according to the diagnosis assistance device 5 according to the embodiment, it is possible to prevent the optical characteristic measurement device 3 from being used while the optical characteristic measurement device 3 remains set at the time of diagnosis.

The diagnosis of the optical characteristic measurement device 3 is described above. Since the diagnosis of the optical characteristic measurement device 3 is performed periodically, the diagnosis assistance device 5 can show a trend of the measurement result to the user in addition to the comparison result shown in FIG. 10. For example, when the diagnosis of the optical characteristic measurement device 3 used for the project name "for bumper measurement" is executed seven times, there are columns Nos. 1 to 7 in Table 1. The control processing unit 51 generates a screen displaying the trend of the measurement result using the above Table 1. The display control unit 511 displays the screen on the display unit 53.

Figure 11:
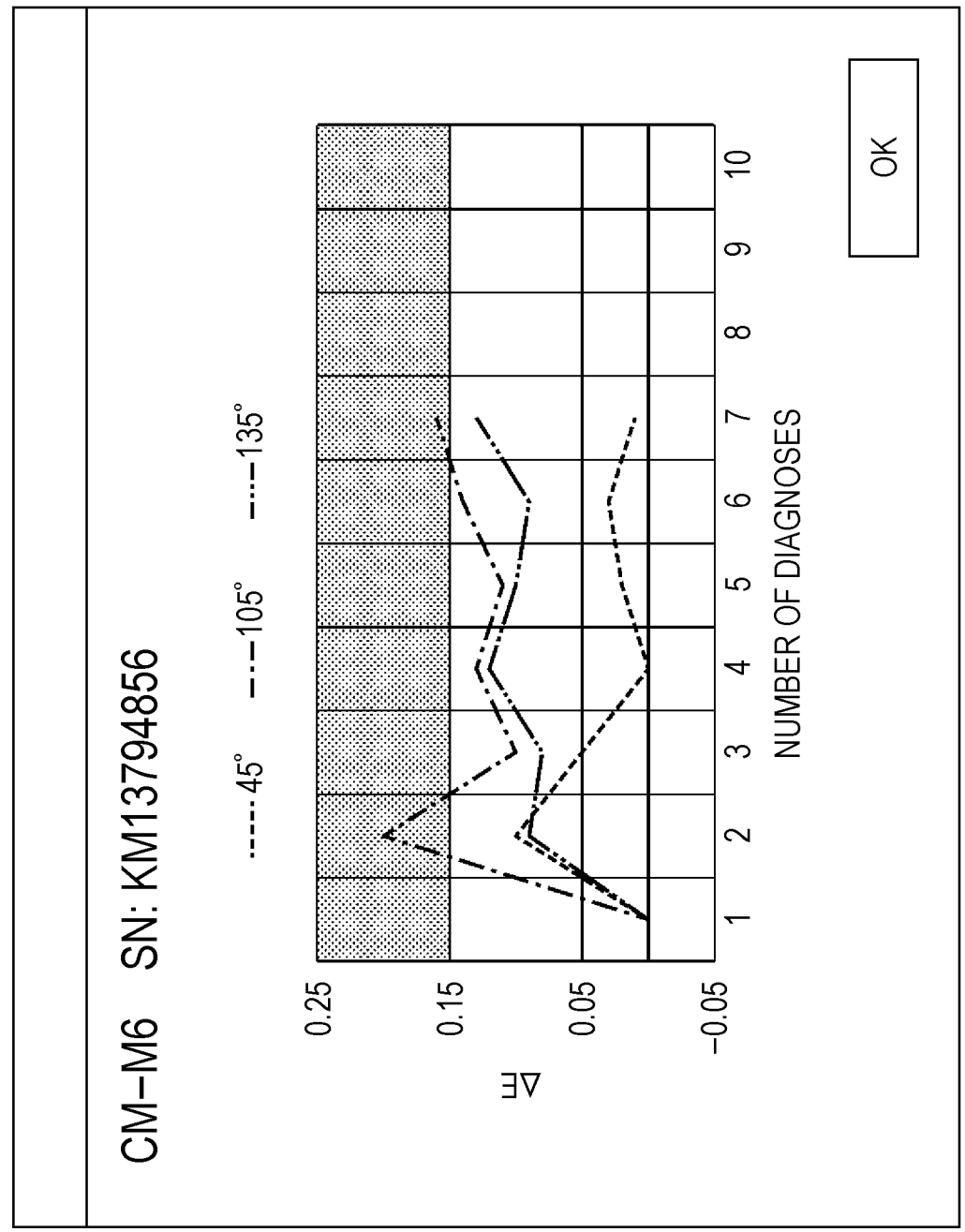
FIG. 11 is an explanatory diagram for explaining an example of a screen showing a trend of a measurement result.

FIG. 11 is an explanatory diagram for explaining an example of a screen 10 displaying the trend of the measurement result. The trend of the measurement result are shown graphically. A horizontal axis of the graph represents the number of diagnoses and a vertical axis represents a color difference ($\Delta E$). The color difference is a difference between the initial value and the color value of the reference plate measured by the optical characteristic measurement device 3 at the time of diagnosis. In the case of the reflected light at 45°, the reflected light at 105°, and the reflected light at 135°, respectively, the color differences are shown. Instead of the color difference, the value of color of the reference plate measured may be used.

When the color difference (ΔE) is equal to or greater than a threshold value, the use of the optical characteristic measurement device 3 is not recommended. In FIG. 11, the threshold value is 0.15. The threshold value can be set at the time of initial setting described above.

The user may look at the screen 10 at the time of diagnosis to determine whether to use the optical characteristic measurement device 3. For example, in the second diagnosis, the color difference in the case of reflected light at 105° exceeds the threshold value. In the use of the optical characteristic measurement device 3, the reflected light at 45° and the reflected light at 135° are measured. The user determines that the optical characteristic measurement device 3 can be used.

The color difference in the case of the reflected light at 135° rises with the passage of time and approaches the threshold value. In the use of the optical characteristic measurement device 3, the reflected light at 45° and the reflected light at 135° are measured, so that the user immediately determines that the optical characteristic measurement device 3 needs to be calibrated.

Referring to FIG. 1, the diagnosis data (for example, Table 1) stored in the third storage unit 517 can be output to the outside of the diagnosis assistance device 5. When the user operates the operating unit 52 to input, to the diagnosis assistance device 5, a command to output the diagnosis data to the outside, the input/output control unit 521 issues a command to output the diagnosis data stored in the third storage unit 517 to the outside. As a result, the diagnosis data is output from the input/output unit 54 and stored in a USB memory. If the USB memory is connected to a personal computer different from the diagnosis assistance device 5, it is possible to see the diagnosis data or the trend of the measurement result shown in FIG. 11 in this personal computer. It is to be noted that after the input/output control unit 521 encrypts the diagnosis data, the input/output unit 54 may output the encrypted diagnosis data.

When the input/output unit 54 outputs the diagnosis file (for example, the diagnosis file 100 in FIG. 7) stored in the first storage unit 512 or the diagnosis data stored in the third storage unit 517 to the outside, the input/output control unit 521 may perform processing of erasing the diagnosis file stored in the first storage unit 512 and the diagnosis data stored in the third storage unit 517. By doing so, it is possible to prevent the diagnosis file or the diagnosis data from leaking from the diagnosis assistance device 5.

A modified example of the embodiment will be described. The diagnosis assistance device according to the modified example is included in the optical characteristic measurement device 3. FIG. 12 is a block diagram showing a configuration of a diagnosis assistance device 5a according to a modified example and a configuration of the optical characteristic measurement device 3 diagnosed by the device. The optical characteristic measurement device 3 includes the diagnosis assistance device 5a. The diagnosis assistance device 5a includes the control processing unit 51 and the input/output unit 54 shown in FIG. 1. The diagnosis assistance device 5a does not include the operating unit 52, the display unit 53, and the communication unit 55 shown in FIG. 1. This is because the operating unit 34, the display unit 35, and the communication unit 36 shown in FIG. 12 have these functions.

When the diagnosis unit (the diagnosis unit 516 shown in FIG. 1) of the diagnosis assistance device 5a diagnoses the optical characteristic measurement device 3 which operates on the basis of the content of setting indicated by the first setting information input from the outside to the input/output unit 54, the permission unit (the permission unit 518 shown in FIG. 1) of the diagnosis assistance device 5a permits the diagnosis of the optical characteristic measurement device 3 without determining the matching of the ID in step S14 (FIG. 8). The reason will be described.

It is assumed that there are the plurality of optical characteristic measurement devices 3 including the diagnosis assistance device 5a. When the first setting information of each of the plurality of optical characteristic measurement devices 3 is the same, it is troublesome for the user to set the first setting information in the diagnosis assistance device 5a in each of the plurality of optical characteristic measurement devices 3. Therefore, the first setting information is set in the diagnosis assistance device 5a included in a first optical characteristic measurement device 3, and the first setting information is used even in the diagnosis assistance device 5a included in the rest optical characteristic measurement devices 3. In this case, first diagnosis information is output from the input/output unit 54 of the diagnosis assistance device 5a included in the first optical characteristic measurement device 3, and the first diagnosis information is input to the input/output unit 54 of the diagnosis assistance device 5a included in the rest optical characteristic measurement devices 3.

The ID of the optical characteristic measurement device 3 associated with the first diagnosis information is the ID of the first optical characteristic measurement device 3. Therefore, when the permission unit 518 of the diagnosis assistance device 5a included in the rest optical characteristic measurement devices 3 inquires the IDs, these diagnosis assistance devices 5a cannot diagnose the optical characteristic measurement device 3 (the reason is that the IDs do not match with each other). Therefore, the permission unit 518 permits the diagnosis of the optical characteristic measurement device 3 without determining the matching of the IDs.

When the input/output unit 54 outputs the first setting information, the input/output control unit 521 of the diagnosis assistance device 5a included in the first optical characteristic measurement device 3 adds a predetermined flag to the first setting information. As a result, the permission unit 518 of the diagnosis assistance device 5a included in the rest optical characteristic measurement devices 3 can determine whether the first setting information is the first setting information input from the outside to the input/output unit 54.

Summary of Embodiment

A diagnosis assistance device of an optical characteristic measurement device according to a first aspect of the embodiment is device for assisting a diagnosis of the optical characteristic measurement device operated on the basis of a content of setting stored in a setting storage unit of the optical characteristic measurement device at the time of use and at the time of diagnosis of the optical characteristic measurement device, in which the diagnosis assistance device includes: a first storage unit which stores in advance first setting information indicating content of setting at the time of diagnosis; a second storage unit; a processing unit which performs processing of acquiring, from the setting storage unit, second setting information which is stored in advance in the setting storage unit and indicates the content of setting at the time of use, and storing the acquired second setting information in the second storage unit; a first command unit which issues a command to store the first setting information, which is stored in the first storage unit, in the setting storage unit after the second setting information is stored in the second storage unit; a diagnosis unit which acquires a measurement result indicating a value measured by the optical characteristic measurement device operated on the basis of the content of setting indicated by the first setting information stored in the setting storage unit, and generates information necessary for the diagnosis of the optical characteristic measurement device using the acquired measurement result; and a second command unit which issues a command to store the second setting information, which is stored in the second storage unit, in the setting storage unit after the diagnosis unit acquires the measurement result.

The diagnosis assistance device of the optical characteristic measurement device according to the first aspect of the embodiment acquires the second setting information stored in the setting storage unit of the optical characteristic measurement device before the optical characteristic measurement device is operated on the basis of the content of setting indicated by the first setting information and stores the acquired second setting information in the second storage unit of the diagnosis assistance device in order to diagnose the optical characteristic measurement device. Next, the diagnosis assistance device stores the first setting information in the setting storage unit of the optical characteristic measurement device. Next, the diagnosis assistance device acquires the measurement result indicating the value measured by the optical characteristic measurement device operated on the basis of the content of setting indicated by the first setting information. Next, the diagnosis assistance device stores the second setting information stored in the second storage unit of the diagnosis assistance device in the setting storage unit of the optical characteristic measurement device. Therefore, according to the diagnosis assistance device of the optical characteristic measurement device according to the first aspect of the embodiment, it is possible to prevent the optical characteristic measurement device from being used while the optical characteristic measurement device remains set at the time of diagnosis.

The diagnosis means, for example, that the diagnosis unit acquires the measurement result which is the value measured by the optical characteristic measurement device, generates the information (for example, the comparison result shown in FIG. 10 and the trend of the measurement result shown in FIG. 11) necessary for the diagnosis of the optical characteristic measurement device using the acquired measurement result, and provides the generated information to the user. The user looks at the information to determine whether the optical characteristic measurement device can be used. The diagnosis is not limited to the above-mentioned meaning. For example, the diagnosis means that the diagnosis unit acquires the measurement result, generates the information using the acquired measurement result, and determines whether the optical characteristic measurement device can be used on the basis of the generated information.

In the above configuration, in the first storage unit, the first setting information provided for each of the plurality of optical characteristic measurement devices and the IDs of each of the plurality of optical characteristic measurement devices are stored in advance in association with each other, and the optical characteristic measurement device to be diagnosed among the plurality of optical characteristic measurement devices further includes a permission unit which determines whether the ID associated with the first setting information selected for diagnosis from the plurality of pieces of first setting information matches the ID of the optical characteristic measurement device to be diagnosed before the optical characteristic measurement device to be diagnosed among the plurality of optical characteristic measurement devices is operated on the basis of the content of setting indicated by the first setting information stored in the setting storage unit, and when the matching is determined, permits the diagnosis unit to diagnose the optical characteristic measurement device to be diagnosed.

When there are the plurality of optical characteristic measurement devices, the first setting information having different contents may be provided for each optical characteristic measurement device. If the first setting information provided for a certain optical characteristic measurement device is used for a diagnosis of another optical characteristic measurement device, an incorrect diagnosis is made. Therefore, in this configuration, the IDs of the plurality of optical characteristic measurement devices are associated with first setting information of each of the plurality of optical characteristic measurement devices, and the diagnosis of the optical characteristic measurement device is permitted when the ID associated with the first setting information selected for diagnosis from the plurality of pieces of the first setting information matches the ID of the optical characteristic measurement device to be diagnosed.

The ID of the optical characteristic measurement device to be diagnosed is acquired from, for example, an ID storage unit included in the optical characteristic measurement device.

In the above configuration, the optical characteristic measurement device further includes an input/output unit which outputs the first setting information to the outside of the diagnosis assistance device, and receives the first setting information from the outside, and an input/output control unit which issues a command to the input/output unit to output the first setting information stored in the first storage unit to the outside, and causes the first storage unit to store the first setting information input from the outside to the input/output unit.

According to this configuration, the first setting information can be imported and exported. Therefore, for example, in order to prevent the first setting information from leaking from the diagnosis assistance device, the first setting information can be stored in the diagnosis assistance device only when the diagnosis is executed.

In the above configuration, after the input/output control unit encrypts the first setting information, the input/output unit outputs the first setting information to the outside.

According to this configuration, even if the first setting information output to the outside is leaked, it is possible to prevent the content of the first setting information from being known.

In the above configuration, the diagnosis assistance device is included in the optical characteristic measurement device, and the permission unit permits the diagnosis of the optical characteristic measurement device without determining the matching when the diagnosis unit diagnoses the optical characteristic measurement device on the basis of the content of settings indicated by the first setting information input from the outside to the input/output unit.

It is assumed that there are the plurality of optical characteristic measurement devices including the diagnosis assistance device. When the first setting information of each of the plurality of optical characteristic measurement devices is the same, it is troublesome for the user to set the first setting information in the diagnosis assistance device in each of the plurality of optical characteristic measurement devices. Therefore, the first setting information is set in the diagnosis assistance device included in the first optical characteristic measurement device, and the first setting information is used even in the diagnosis assistance device included in the rest optical characteristic measurement devices. In this case, the first diagnosis information is output from the input/output unit of the diagnosis assistance device included in the first optical characteristic measurement device, and the first diagnosis information is input to the input/output unit of the diagnosis assistance device included in the rest optical characteristic measurement devices.

The ID of the optical characteristic measurement device associated with the first diagnosis information is the ID of the first optical characteristic measurement device. Therefore, when the permission unit of the diagnosis assistance device included in the rest optical characteristic measurement devices inquires the IDs, these diagnosis assistance devices cannot diagnose the optical characteristic measurement device 3 (the reason is that the IDs do not match with each other). Therefore, the permission unit permits the diagnosis of the optical characteristic measurement device without determining the matching of the IDs.

It is to be noted that there is a mode in which the diagnosis assistance device switches the ID of the optical characteristic measurement device associated with the first diagnosis information from the ID of the first optical characteristic measurement device to the IDs of the rest optical characteristic measurement devices. According to this mode, since the permission unit determines the matching of the IDs, it is possible to prevent the user from incorrectly diagnosing the optical characteristic measurement device. There are two modes.

The first mode will be described. After the first setting information is set in the diagnosis assistance device included in the first optical characteristic measurement device, the user inputs the IDs of the rest optical characteristic measurement devices (the ID of the second optical characteristic measurement device, the ID of the third optical characteristic measurement device, . . . ) to the diagnosis assistance device. This diagnosis assistance device performs the processing of switching the ID associated with the first setting information from the first optical characteristic measurement device to the IDs of the rest optical characteristic measurement devices (the diagnosis assistance device included in the first optical characteristic measurement device performs processing of generating the first setting information associated with the ID of the second optical characteristic measurement device, the first setting information associated with the ID of the third optical characteristic measurement device, . . . , respectively). The first setting information with which the IDs of the rest optical characteristic measurement devices are associated is input to the diagnosis assistance device included in the rest optical characteristic measurement devices (the first setting information associated with the ID of the second optical characteristic measurement device is input to the diagnosis assistance device included in the second optical characteristic measurement device, and the first setting information associated with the ID of the third optical characteristic measurement device is input to the diagnosis assistance device included in the third optical characteristic measurement device).

The second mode will be described. After the first setting information (hereinafter, referred to as first setting information A) is set in the diagnosis assistance device included in the first optical characteristic measurement device, the diagnosis assistance device generates the first setting information (hereinafter referred to as first setting information B) with which the ID is not associated. The first setting information B is the same as the first setting information A except that it is not associated with the ID. The first setting information B is input to the diagnosis assistance device included in the rest optical characteristic measurement devices. When the ID is not associated with the first setting information (that is, in the case of the first setting information B), the permission unit is set not to determine the matching of the IDs. In the first diagnosis using the diagnosis assistance device included in the rest optical characteristic measurement devices, the matching of the IDs is not a problem. The diagnosis assistance device included in the rest optical characteristic measurement devices performs the processing of associating the first setting information B with the IDs of the rest optical characteristic measurement devices after performing the first diagnosis. When the diagnosis assistance device included in the rest optical characteristic measurement devices performs the next diagnosis (the second diagnosis, the third diagnosis, . . . ), the permission unit determines the matching of the IDs.

In the above configuration, after the permission unit permits the diagnosis of the optical characteristic measurement device to be diagnosed, the processing unit performs the processing of acquiring the second setting information from the setting storage unit and storing the acquired second setting information in the second storage unit.

The diagnosis unit cannot diagnose the optical characteristic measurement apparatus unless the permission unit permits the diagnosis of the optical characteristic measurement device to be diagnosed. If the permission unit does not permit the diagnosis of the optical characteristic measurement device to be diagnosed after the processing by the processing unit, the processing by the processing unit is wasted. According to this configuration, after the permission unit permits the diagnosis of the optical characteristic measurement device to be diagnosed, the processing unit performs the processing, so that the waste can be prevented.

In the above configuration, the diagnosis assistance device further includes a prohibition unit which prohibits change of the content of setting of the optical characteristic measurement device during the operation of the optical characteristic measurement device on the basis of the content of setting indicated by the first setting information stored in the setting storage unit.

When the content set in the optical characteristic measurement device is changed during the operation of the optical characteristic measurement device (for example, a hand touches the setting screen displayed on the display unit of the optical characteristic measurement device to change the content of setting), the correct diagnosis cannot be made. According to the configuration, it is possible to prevent such a situation.

A diagnosis assistance method of an optical characteristic measurement device according to a second aspect of the embodiment is a method for assisting a diagnosis of the optical characteristic measurement device operated on the basis of a content of setting stored in a setting storage unit of the optical characteristic measurement device at the time of use and at the time of diagnosis of the optical characteristic measurement device, in which the diagnosis assistance method includes: a first storing step of storing in advance first setting information indicating the content of setting at the time of diagnosis; a processing step of performing processing of acquiring, from the setting storage unit, second setting information which is stored in advance in the setting storage unit and indicates the content of setting at the time of use and storing the acquired second setting information; a first command issuing step of issuing a command to store the first setting information, which is stored in the first storing step, in the setting storage unit after the second setting information is stored in the processing step; a diagnosing step of acquiring a measurement result indicating a value measured by the optical characteristic measurement device operated on the basis of the content of setting indicated by the first setting information stored in the setting storage unit, and generating information necessary for the diagnosis of the optical characteristic measurement device using the acquired measurement result; and a second command issuing step of issuing a command to store the second setting information, which is stored in the processing step, in the setting storage unit after the measurement result is acquired in the diagnosing step.

The diagnosis assistance method of the optical characteristic measurement device according to the second aspect of the embodiment is prescribed from the viewpoint of the diagnosis assistance device of the optical characteristic measurement device according to the first aspect of the embodiment and has the same effects as the first aspect of the embodiment.

The embodiments of the invention are illustrated and described in detail, but are not limited only to illustrations and examples. The scope of the present invention should be interpreted by the wording of the attached claims.

Japanese patent application No. 2016-198117 filed on Oct. 6, 2016, including the specification, claims, drawings, and abstract, the entire disclosure of which is hereby incorporated by reference in its entirety.

INDUSTRIAL APPLICABILITY

According to the present invention, it is possible to provide a diagnosis assistance device of an optical characteristic measurement device and a diagnosis assistance method of an optical characteristic measurement device.

The invention claimed is:

1. A diagnosis assistance device of an optical characteristic measurement device for assisting a diagnosis of the optical characteristic measurement device operated on the basis of a content of setting stored in a hardware processor of the optical characteristic measurement device at a time of use and at a time of diagnosis of the optical characteristic measurement device, comprising
a hardware processor that:
stores in advance first setting information indicating the content of setting at the time of diagnosis;
performs processing of acquiring, from the hardware processor of the optical characteristic measurement device, second setting information which is stored in advance in the hardware processor of the optical characteristic measurement device and indicates the content of setting at the time of use, and storing the acquired second setting information;
issues a command to store the first setting information in the hardware processor of the optical characteristic measurement device after the second setting information is stored;
acquires a measurement result indicating a value measured by the optical characteristic measurement device operated on the basis of the content of setting indicated by the first setting information stored in the hardware processor of the optical characteristic measurement device, and generates information necessary for the diagnosis of the optical characteristic measurement device using the acquired measurement result; and
issues a command to store the second setting information in the hardware processor of the optical characteristic measurement device acquiring the measurement result,
wherein the hardware processor prohibits change of the content of setting of the optical characteristic measurement device during the operation of the optical characteristic measurement device on the basis of the content of setting indicated by the first setting information stored in the hardware processor of the optical characteristic measurement device,
wherein the hardware processor prohibits change of the content of setting of the optical characteristic measurement device during the operation by locking the operation screen.

2. The diagnosis assistance device of an optical characteristic measurement device according to claim 1, wherein
in the hardware processor, the first setting information provided for each of a plurality of optical characteristic measurement devices and IDs of each of the plurality of optical characteristic measurement devices are stored in advance in association with each other, and
the hardware processor determines whether the ID associated with the first setting information selected for diagnosis from the plurality of pieces of first setting information matches the ID of the optical characteristic measurement device to be diagnosed before the optical characteristic measurement device to be diagnosed among the plurality of optical characteristic measurement devices is operated on the basis of the content of setting indicated by the first setting information stored in the hardware processor of the optical characteristic measurement device, and when the matching is determined, permits the diagnosis of the optical characteristic measurement device to be diagnosed.

3. The diagnosis assistance device of an optical characteristic measurement device according to claim 2, further comprising
an input/output part which outputs the first setting information to an outside of the diagnosis assistance device, and receives the first setting information from the outside, wherein
the hardware processor issues a command to the input/output part to output the first setting information stored to the outside, and stores the first setting information input from the outside to the input/output part.

4. The diagnosis assistance device of an optical characteristic measurement device according to claim 3, wherein the hardware processor encrypts the first setting information, and then the input/output part outputs the first setting information to the outside.

5. The diagnosis assistance device of an optical characteristic measurement device according to claim 4, wherein
the diagnosis assistance device is included in the optical characteristic measurement device, and
the hardware processor permits the diagnosis of the optical characteristic measurement device when the matching is not determined when diagnosing the optical characteristic measurement device operated on the basis of the content of setting indicated by the first setting information input from the outside to the input/output part.

6. The diagnosis assistance device of an optical characteristic measurement device according to claim 4, wherein the hardware processor performs processing of acquiring the second setting information from the hardware processor of the optical characteristic measurement device and storing the acquired second setting information after permitting the diagnosis of the optical characteristic measurement device to be diagnosed.

7. The diagnosis assistance device of an optical characteristic measurement device according to claim 3, wherein
the diagnosis assistance device is included in the optical characteristic measurement device, and
the hardware processor permits the diagnosis of the optical characteristic measurement device when the matching is not determined when diagnosing the optical characteristic measurement device operated on the basis of the content of setting indicated by the first setting information input from the outside to the input/output part.

8. The diagnosis assistance device of an optical characteristic measurement device according to claim 7, wherein the hardware processor performs processing of acquiring the second setting information from the hardware processor of the optical characteristic measurement device and storing the acquired second setting information after permitting the diagnosis of the optical characteristic measurement device to be diagnosed.

9. The diagnosis assistance device of an optical characteristic measurement device according to claim 3, wherein the hardware processor performs processing of acquiring the second setting information from the hardware processor of the optical characteristic measurement device and storing the acquired second setting information after permitting the diagnosis of the optical characteristic measurement device to be diagnosed.

10. The diagnosis assistance device of an optical characteristic measurement device according to claim 2, wherein the hardware processor performs processing of acquiring the second setting information from the hardware processor of the optical characteristic measurement device and storing the acquired second setting information permitting the diagnosis of the optical characteristic measurement device to be diagnosed.

11. The diagnosis assistance device of an optical characteristic measurement device according to claim 1, further comprising a communication unit configured to receive an instruction to prohibit the change of the content of setting of the optical characteristic measurement device.

12. A diagnosis assistance method of an optical characteristic measurement device for assisting a diagnosis of the optical characteristic measurement device operated on the basis of a content of setting stored in a hardware processor of the optical characteristic measurement device at a time of use and at a time of diagnosis of the optical characteristic measurement device, comprising:
storing in advance first setting information indicating the content of setting at the time of diagnosis;
performing processing of acquiring, from the hardware processor, second setting information which is stored in advance in the hardware processor and indicates the content of setting at the time of use, and storing the acquired second setting information;
issuing a command to store the first setting information, which is stored in the storing in advance, in the hardware processor after the second setting information is stored in the processing of acquiring and storing;
acquiring a measurement result indicating a value measured by the optical characteristic measurement device operated on the basis of the content of setting indicated by the first setting information stored in the hardware processor, and generating information necessary for the diagnosis of the optical characteristic measurement device using the acquired measurement result;
issuing a command to store the second setting information, which is stored in the processing of acquiring and storing, in the hardware processor after the measurement result is acquired in the acquiring and generating and
issuing a command to prohibit change of the content of setting of the optical characteristic measurement device during the operation of the optical characteristic measurement device on the basis of the content of setting indicated by the first setting information stored in the hardware processor of the optical characteristic measurement device,
wherein the hardware processor prohibits change of the content of setting of the optical characteristic measurement device during the operation by locking the operation screen.

13. The diagnosis assistance method according to claim 12, further comprising receiving by a communication unit an instruction to prohibit the change of the content of setting of the optical characteristic measurement device.

\* \* \* \* \*